(12) United States Patent
Ohara

(10) Patent No.: US 6,639,686 B1
(45) Date of Patent: Oct. 28, 2003

(54) METHOD OF AND APPARATUS FOR REAL-TIME CONTINUAL NANOMETER SCALE POSITION MEASUREMENT BY BEAM PROBING AS BY LASER BEAMS AND THE LIKE OF ATOMIC AND OTHER UNDULATING SURFACES SUCH AS GRATINGS OR THE LIKE RELATIVELY MOVING WITH RESPECT TO THE PROBING BEAMS

(75) Inventor: Tetsuo Ohara, Billerica, MA (US)

(73) Assignee: Nanowave, Inc., Billerica, MA (US)

( * ) Notice: Subject to any disclaimer, the term of this patent is extended or adjusted under 35 U.S.C. 154(b) by 0 days.

(21) Appl. No.: 09/549,115

(22) Filed: Apr. 13, 2000

(51) Int. Cl.$^7$ ............................................. G01B 11/24
(52) U.S. Cl. ..................................................... 356/616
(58) Field of Search ................... 356/616, 601, 356/614, 615, 624; 250/306, 307

(56) References Cited

U.S. PATENT DOCUMENTS

| | | | | |
|---|---|---|---|---|
| 5,029,023 A | * | 7/1991 | Bearden et al. | 369/69 |
| 5,260,562 A | * | 11/1993 | Bearden et al. | 250/216 |
| 5,298,975 A | * | 3/1994 | Khoury et al. | 356/375 |
| 5,589,686 A | * | 12/1996 | Ohara | 250/306 |

* cited by examiner

Primary Examiner—Hoa Q. Pham
(74) Attorney, Agent, or Firm—Rines and Rines

(57) ABSTRACT

An improved method of and apparatus for real-time continual nanometer scale position measurement by beam probing as by laser beams and the like, both fixed and oscillating or scanning, over an atomic and other undulating surface such as gratings or the like, relatively moving with respect to the probing beams; and providing, where desired, increased detection speeds, improved positioning sensing response, freedom from or relaxed requirements of strict control on probing oscillation amplitude, and multi-dimensional position measurement with focused beam probes and the like.

28 Claims, 18 Drawing Sheets

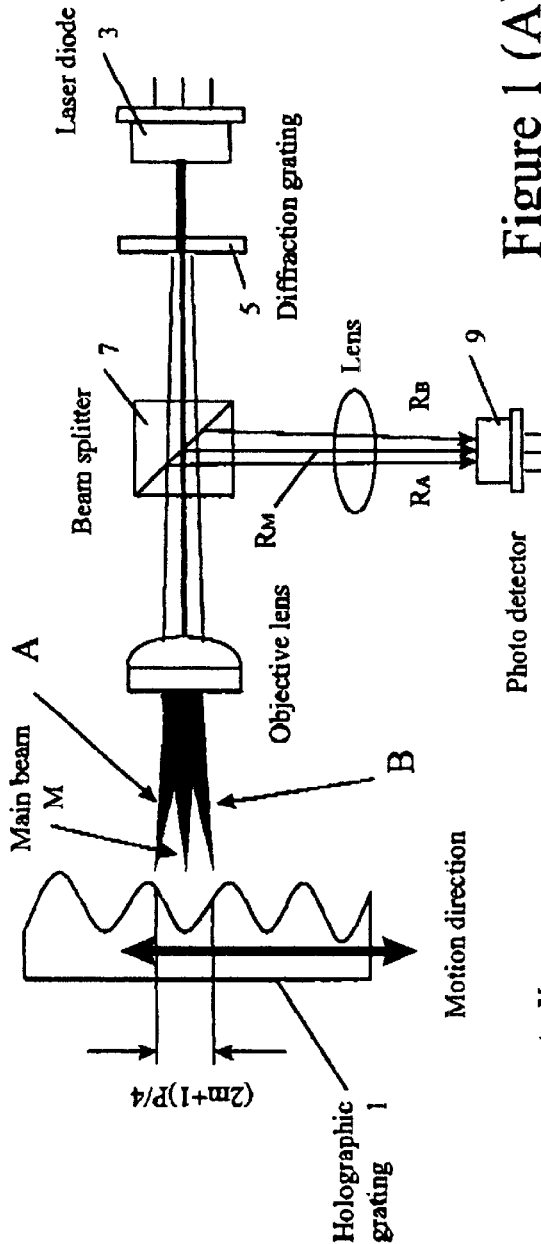
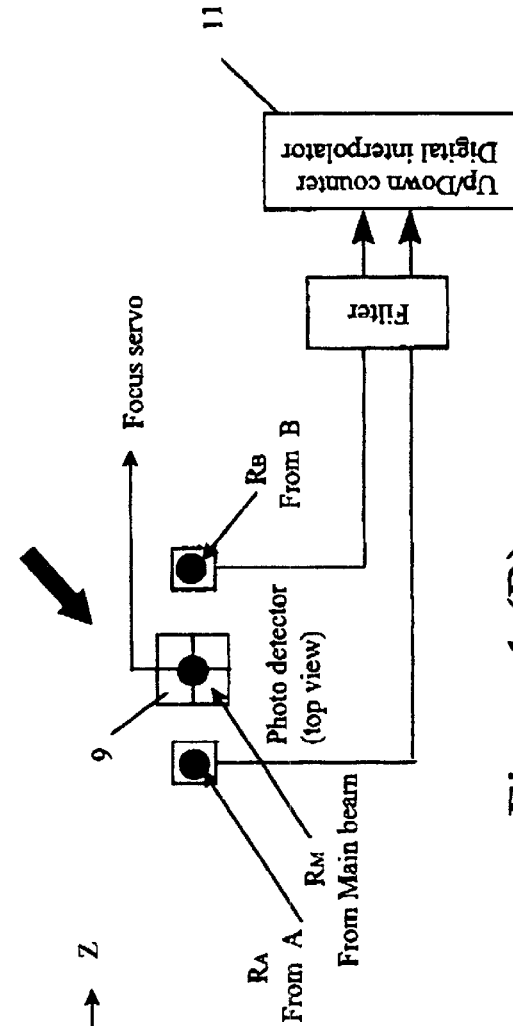
Figure 1 (A)
Figure 1 (B)

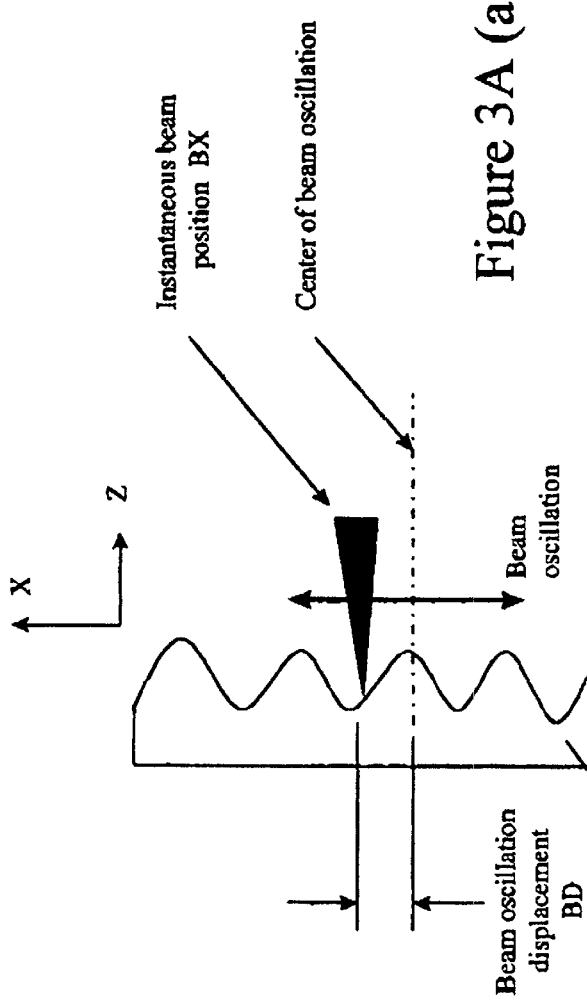
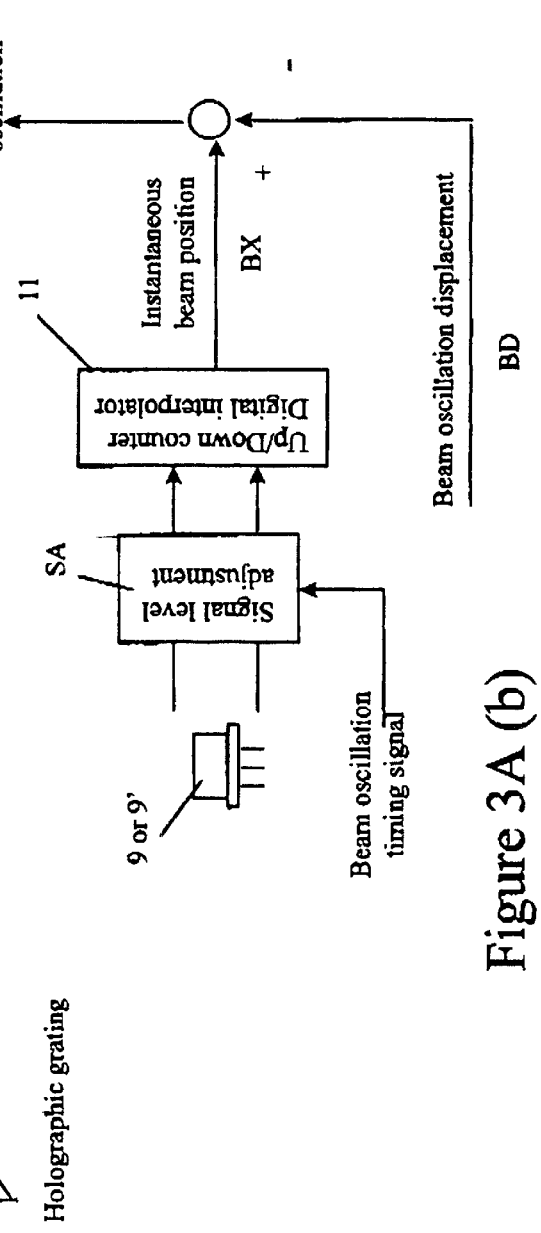
Figure 3A (a)
Figure 3A (b)

METHOD OF AND APPARATUS FOR REAL-TIME CONTINUAL NANOMETER SCALE POSITION MEASUREMENT BY BEAM PROBING AS BY LASER BEAMS AND THE LIKE OF ATOMIC AND OTHER UNDULATING SURFACES SUCH AS GRATINGS OR THE LIKE RELATIVELY MOVING WITH RESPECT TO THE PROBING BEAMS

The present invention relates to nanometer and other inter-atomic position measurements and the like with the aid of probing sensors relatively moving with respect to periodically undulating atomic or other surfaces, such as gratings and the like, over which position locations are to be determined in real time.

BACKGROUND OF INVENTION

Limitations in prior art laser beam interferometry measurements and similar prior optical probing techniques led to the development of oscillating sensing probes between which and such surfaces, sensing fields were established, relying upon the generation of sinusoidal output voltages measured after passing through the surface from the oscillation-controlled probe that, by comparison of the phase and amplitude of the oscillation controlling and resulting sinusoidal output voltages, enabled the development on a continual basis of positional signals indicative of the position of the probe along the surface, as described in my earlier U.S. Pat. Nos. 5,589,686 and 5,744,799.

As detailed in my said prior patents, real-time continual nanometer scale position measurement data of the location of a sensing probe relatively moving with respect to an undulating surface (an atomic surface or a grating or the like) is achieved through rapid oscillating of the probe under the control of sinusoidal voltages as a sensing field is established between the surface and the probe, producing output sinusoidal voltages by the current generated in the sensing field. As therein detailed, comparison of the phase and amplitude of such output voltages provides positional signals indicative of the direction and distance off the apex of the nearest atom or undulation of the surface. Circuits for developing such positional signals are disclosed in said patents and, where desired feedback is shown effected of the positional signals to control the relative movement of the probe and surface.

There are circumstances, however, where it is desirable to use probing by energy beams, such as by laser beams (and, as later discussed, other energy beams such as electron and ion beams and the like) as distinguished from physical, capacitor or magnetic probes illustrated in said patents; and, indeed, to use the beam energy not only in probing over the surface but as a contributor to the setting up of the sensing energy field with the atomic or other insulating surface itself.

Laser interferometers, indeed, are almost exclusively used presently for high precision position measurements. Practical limits and precision in resolution are, however, being reached for reasons, including those which have been explained in said patents.

A laser scale position encoder which uses a laser source and a holographic grating as a reference scale, for example, utilizes the interference produced between the two first order (+/−) diffracted laser beams generated through a holographic scale. While this method somewhat circumvents the problem of ordinary laser interferometry by reducing environmental sensitivity to shorter laser path length, diffraction theory limits the minimum period of the reference grating that can be used; roughly on the order of the light source wavelength, e.g. 632 nm for He—Ne lasers. This means that an atomic level of precision is difficult to achieve with this type of laser scale position encoder. Any changes of the beam path length caused by, for example, table tilting and laser wavelength shift, furthermore, will result in rather significant incorrect position measurement. Gap changes between the head and the reference grating will usually either cause significant error of position measurement or no effect on the system due to symmetric optics location. Thus, such cannot be used for multi-axis position measurement systems of the type described in my said patents. Finally, this technique relies on the average effect (usually several mm) of thousands of grating lines and spaces for a resultant interference pattern. While this generally provides better signal-to-noise ratio in measurement, the basic assumptions, like homogeneity of the temperature distribution and periodicity of the grating lines and spaces over such broad area, do not accurately hold, so as to achieve atomic precision (repeatability) in position measurement.

In general, diffraction limits the smallest focusable laser spot size, which is roughly on the order of the laser source wavelength. Recent progress in near field optical technology and other super resolution enhancement technology, however, [J. Tominaga, T. Nakao, and N. Atoda, "An approach for recording and readout beyond the diffraction limit with an Sb thin film", Applied Physics Letters, Volume 73, Number 15, October, 1998] has enabled the focusing of the laser beam to a size even smaller than the theoretical limit imposed by diffraction theory.

The present invention in one of its applications, however, takes advantage of such a narrowly focused laser beam, which has now been found also to be utilizable as a beam probe for position measurement, now realizing nanometer precision position measurement through adoption therewith of the different techniques of my said patents.

In other applications, such as optical disc technology and the like, several technologies have been developed to detect an off-track signal, which indicates the distance between the nearest track center and the beam spot center. These include three beam, push-pull and differential phase detection (DPD) methods which are popular for those types of systems. If this type of operation were to be applied to the field of the present invention, however, replacing the optical disc with a holographic grating and providing a displacement sensor, neither the off-track information nor the total beam reflection signal alone can provide information about the nanometer-scale, real-time position measurement results. Such an approach, therefore, cannot be directly applied for position measurement purposes. The present invention, on the other hand, reliably provides both motion direction and position, while using focused laser beam(s).

The current invention achieves its improvement in nanometer position measurement and control by replacing what might be termed the "front end" of the systems taught in my said patents with novel laser beam probing systems which are hereinafter described in detail as the novel beam probing "front ends" substituted for the physical probes of my said patents, with the understanding that the same output voltage comparison and processing circuits used in the systems of said patents are to be understood as employed therewith; such that the details thereof are not repeated herein in order to avoid complicating the disclosure and detracting from the features of novelty of the present invention.

OBJECTS OF INVENTION

An object of the invention, therefore, is to provide a new and improved nanometer measurement method and system that, through using laser (or other radiation) beam probing, shall not be subject to the above-described and other limitations of prior laser interferometry systems and the like, or of prior physical probes, but that, to the contrary, provide novel beam probing techniques that enable nanometer precision measurement both in motion direction and position.

A further object is to provide such a new system in which the beam probing may be effected both with beam oscillation or scanning, and also, where desired with non-oscillating beams, as well.

An additional object is to provide, also, improved position sensing response and operation particularly advantageous in such laser beam probing systems.

Other and further objects will be explained hereinafter find are more particularly described in connection with the appended claims.

SUMMARY OF INVENTION

In summary, however, from one of its important aspects, the invention embraces a method of real-time nanometer scale position measurement of the location of a radiation beam probe relatively moving over a periodically undulating surface, that comprises, focusing and impinging the beam upon the surface during such relative movement and receiving the successive reflections of the beam from the surface; generating substantially sinusoidal voltages through the reception of the beam reflections having the periodicity of the surface undulations; comparing the phase and amplitude of the generated sinusoidal voltages with a reference sinusoidal voltage at a related frequency through multiplying the generated and reference voltages to develop positional signals, on a continual basis, indicative of the direction and distance of the beam probe off the apex of the nearest undulation of the surface, and thus the position of the beam probe along the surface.

Preferred and best mode designs and configurations will later be explained in more detail.

DRAWINGS

The invention will now be described in connection with the accompanying drawings, FIG. 1(A) of which is a side view of a position measurement apparatus constructed in accordance with the principles of the invention and embodying a split multiple (three) focused non-oscillating laser beam probing technique;

FIG. 1(B) is a top elevation of the photo detection and processing components of the system of FIG. 1(A);

FIGS. 2(A) and 2(B) are views similar respectively to FIGS. 1(A) and 1(B), but of a modified single probing laser beam position measurement system using the herein described push-pull technique;

FIG. 3 is a schematic isometric view of apparatus for obtaining high accuracy in position measurement in systems such as FIGS. 1A–2B and other systems, using laser diode sources of beam energy;

FIGS. 3A($a$) and FIG. 3A($b$) show modified beam oscillation and instantaneous position determination techniques for systems such as those, for example, of FIGS. 4 and 4A;

Figure 4:
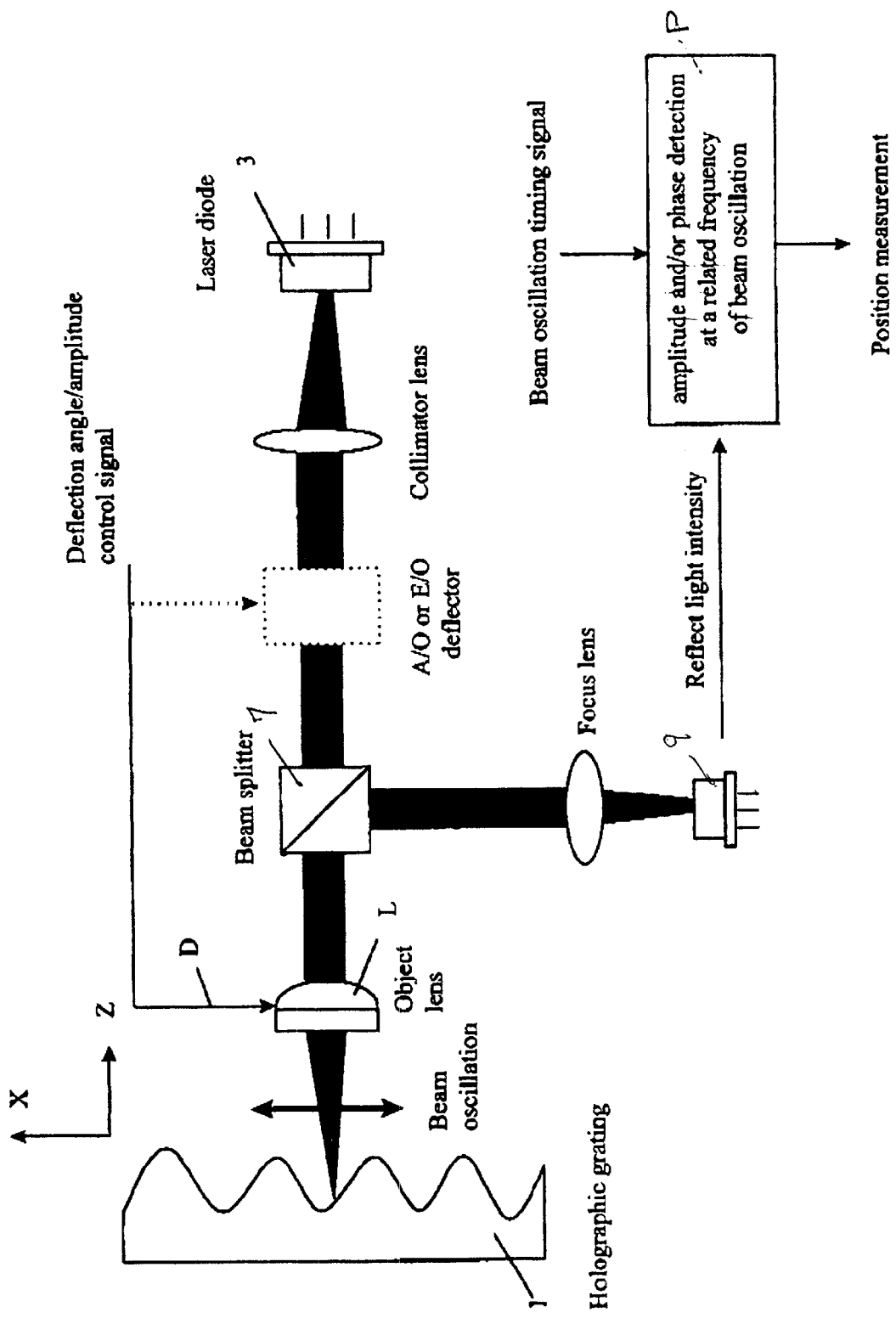
FIG. 4 is a system diagram of a further modification using a scanning type laser beam also in accordance with the technique of the present invention.
Figure 4A:
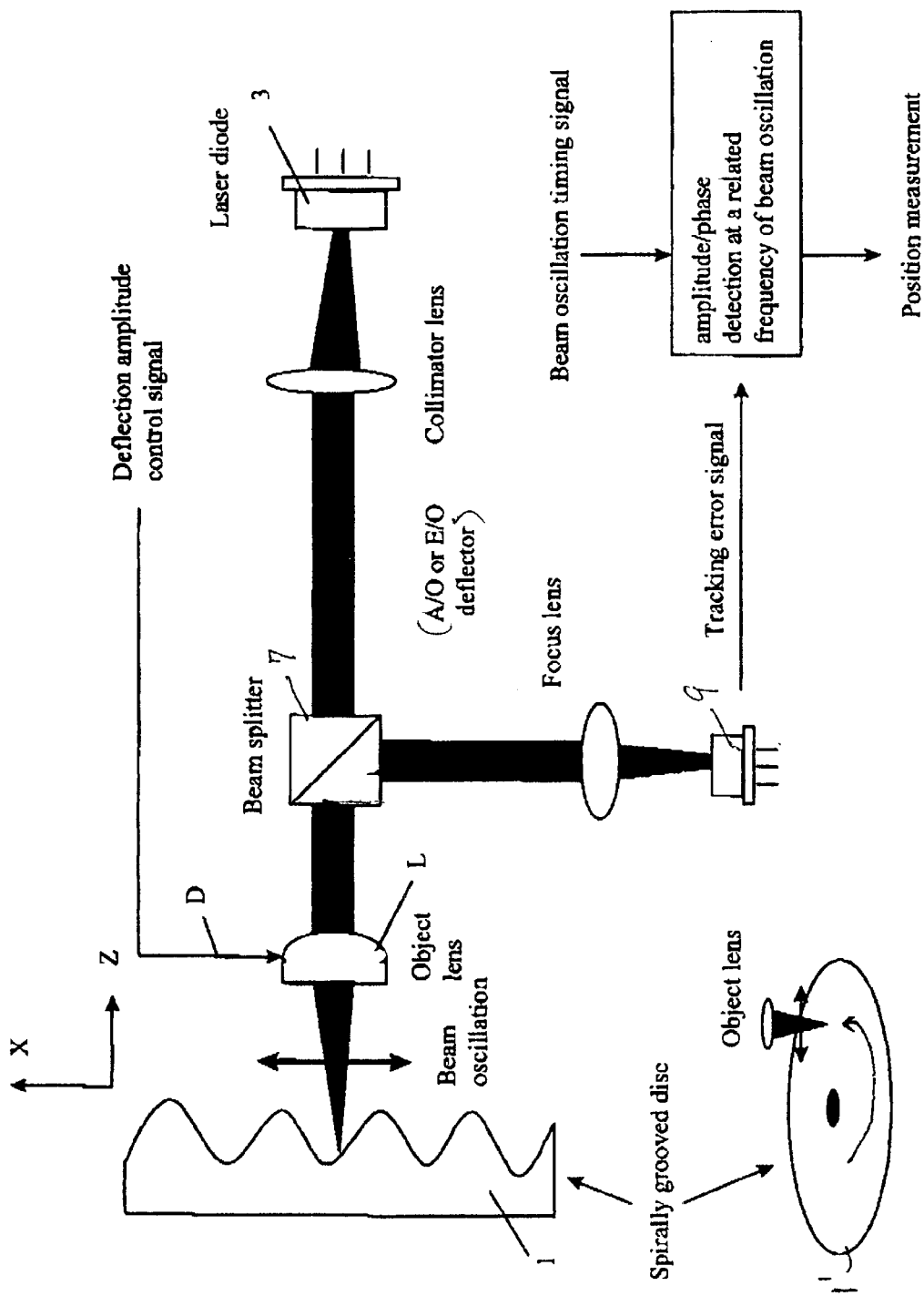
FIG. 4(A) is a modification of the embodiment of FIG. 4 use a tracking error signal as a periodic signal corresponding to the grating periodicity.
Figure 4B:
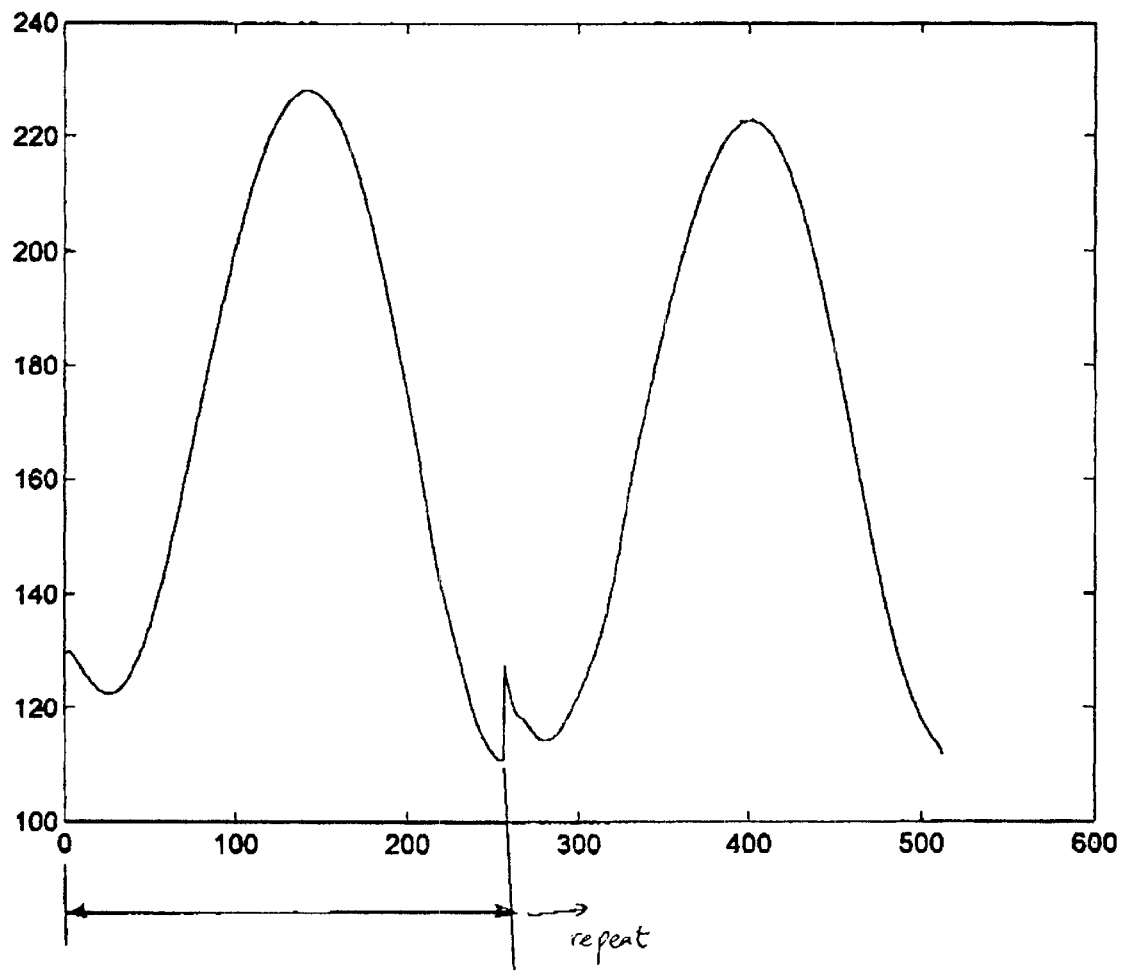
Figure 4C:
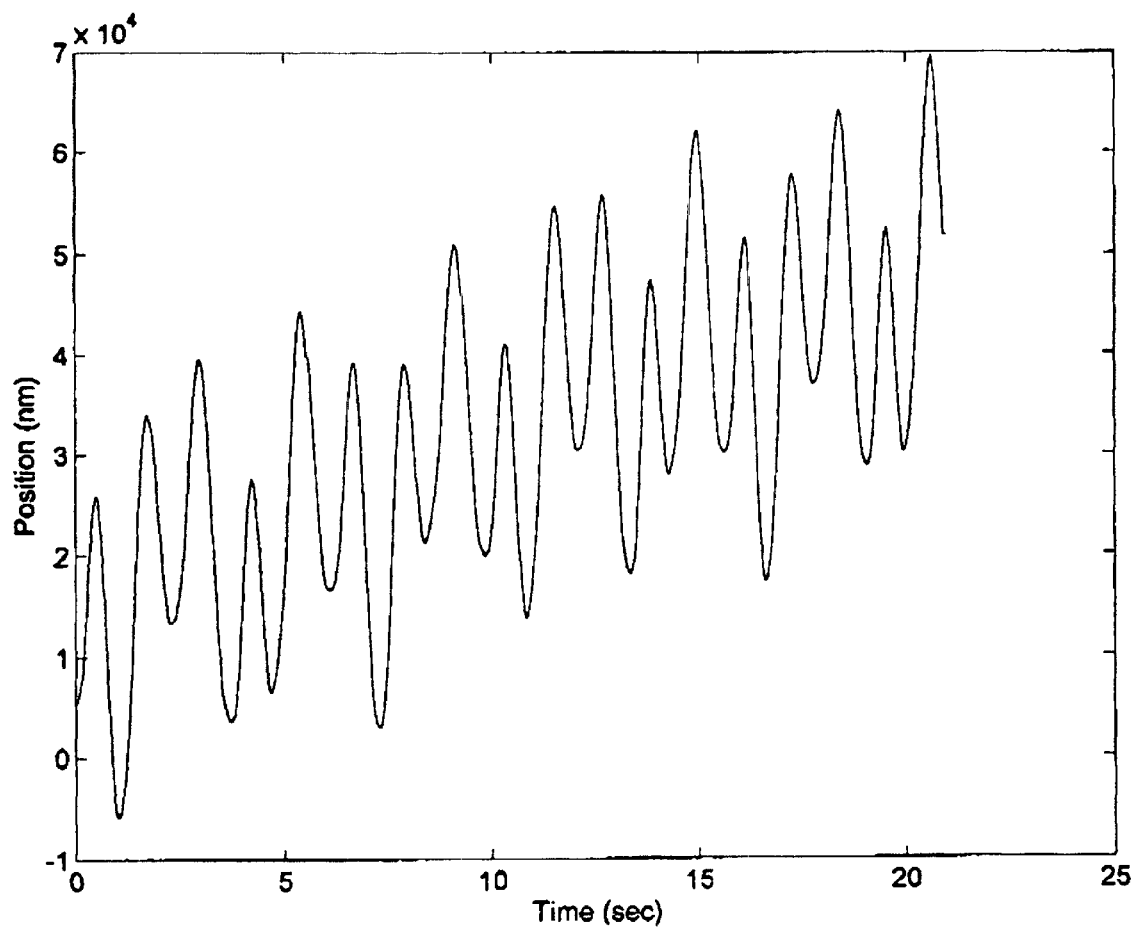
Figure 5:
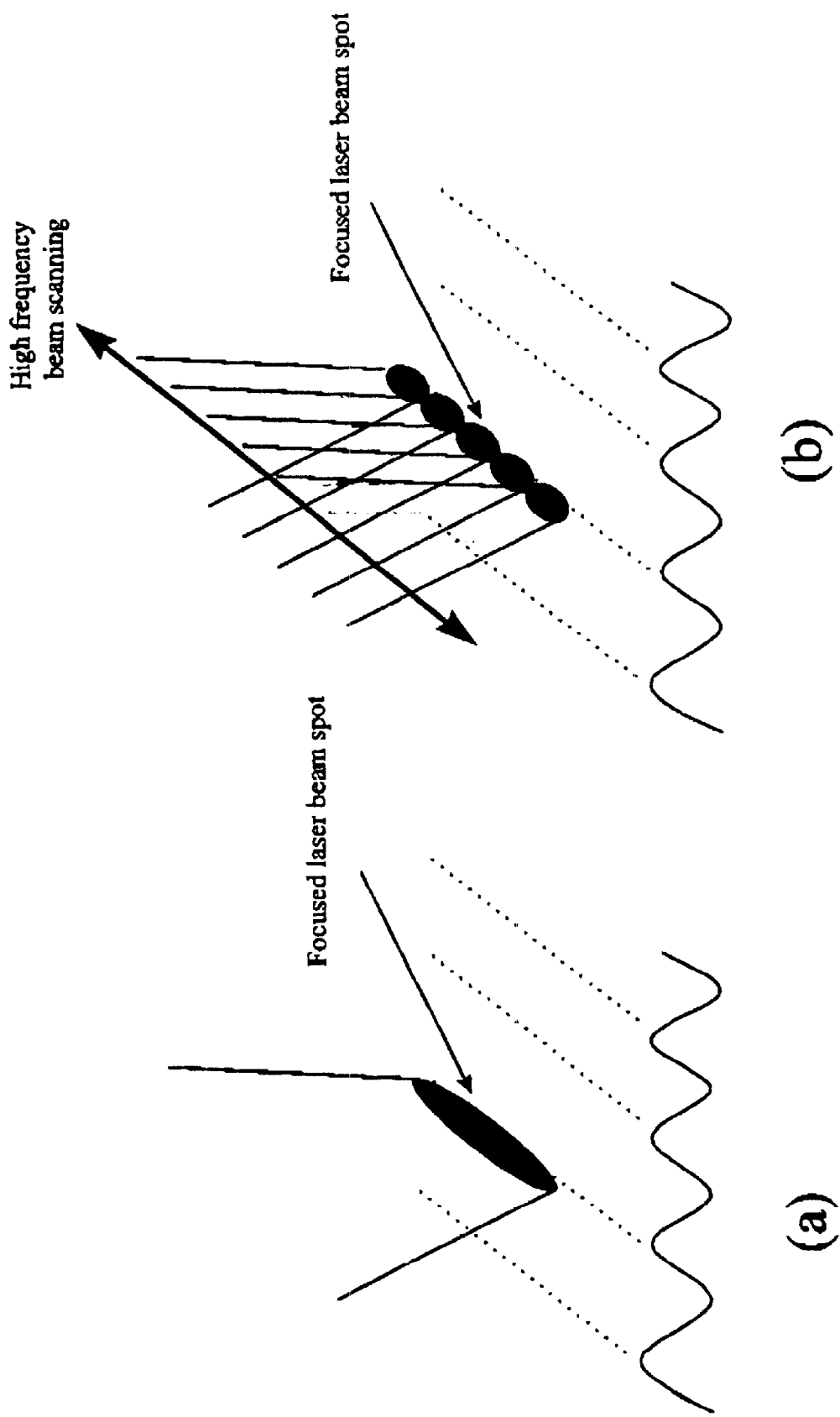
Figure 5A:
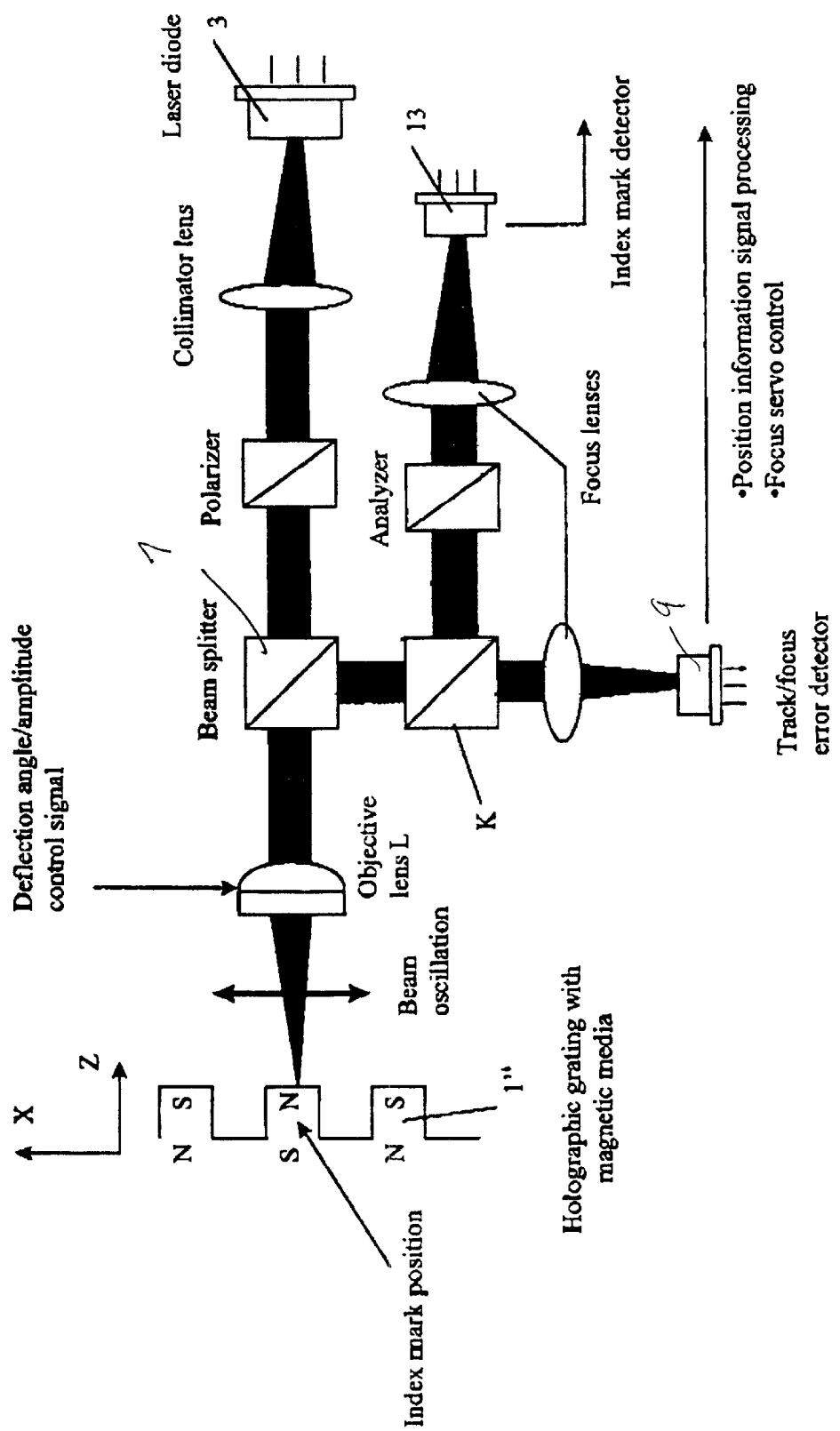
Figure 6:
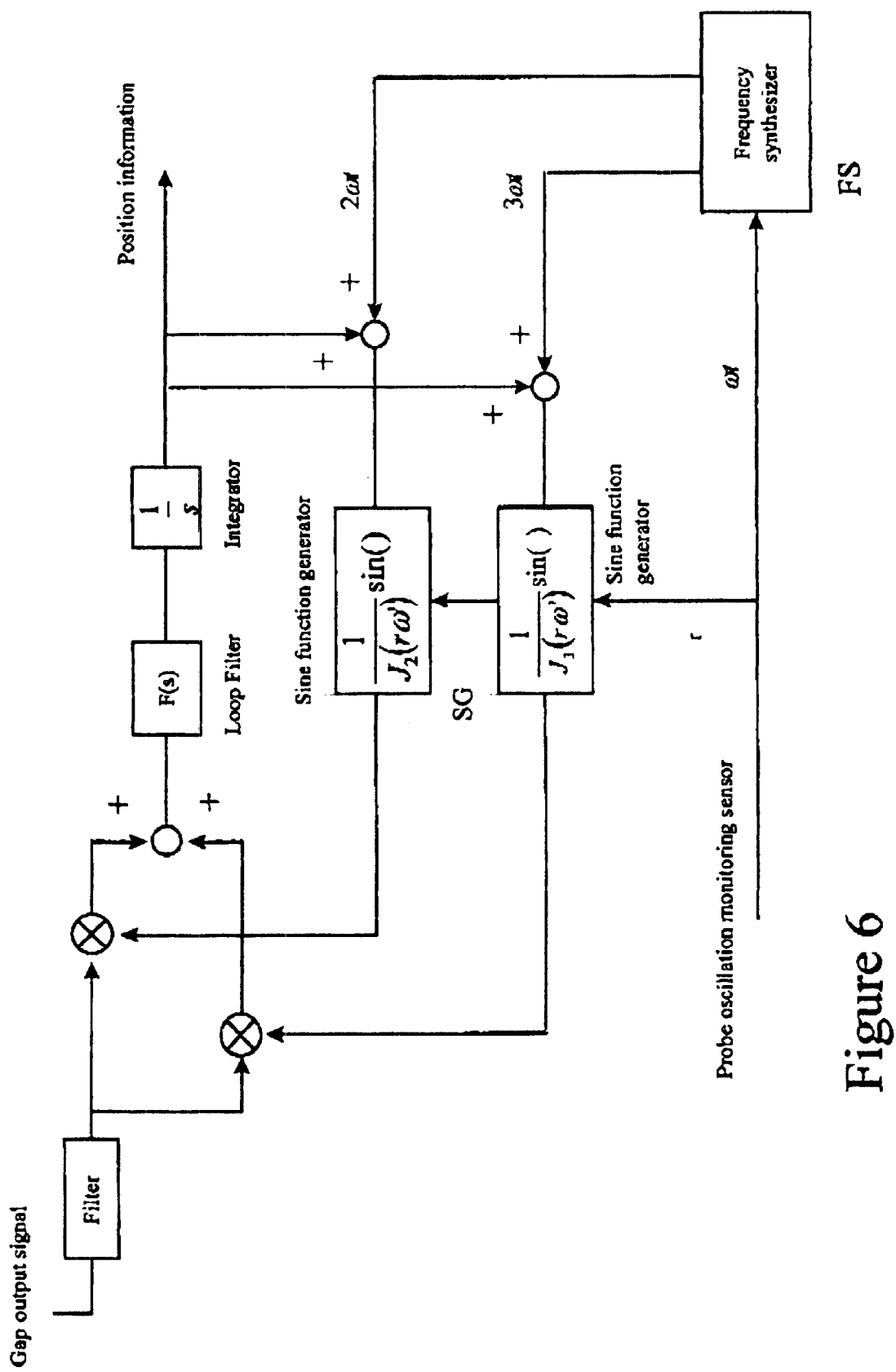
Figure 7:
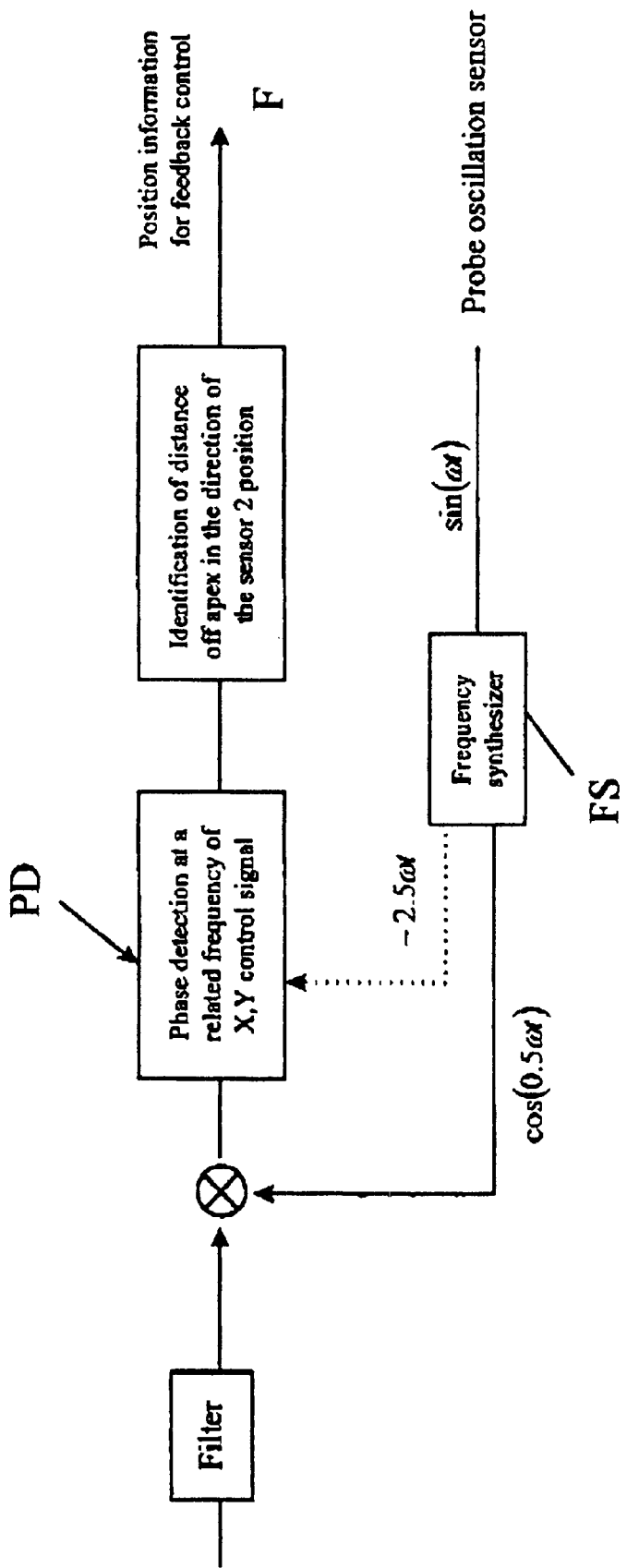
Figure 8:
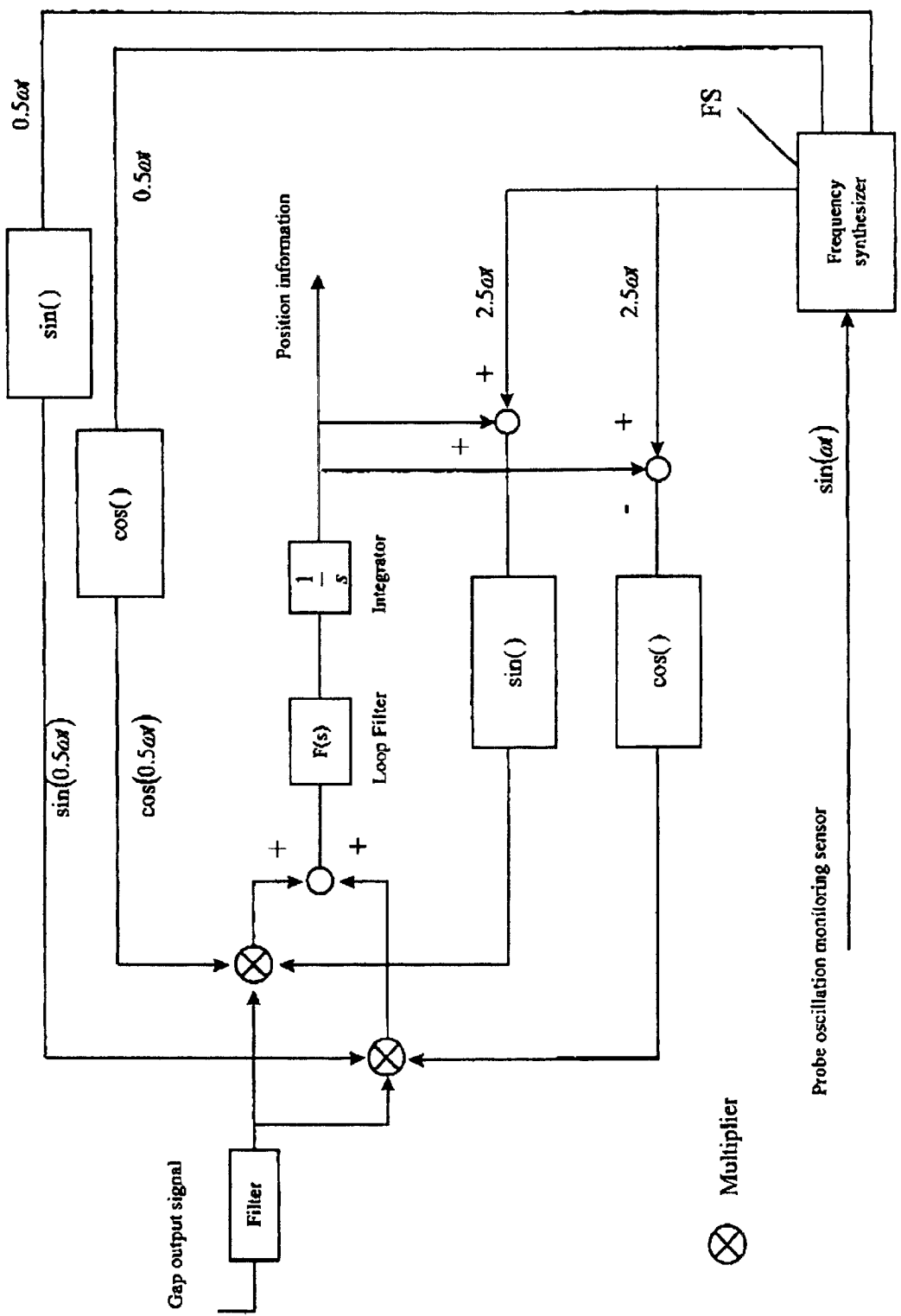
Figure 8B:
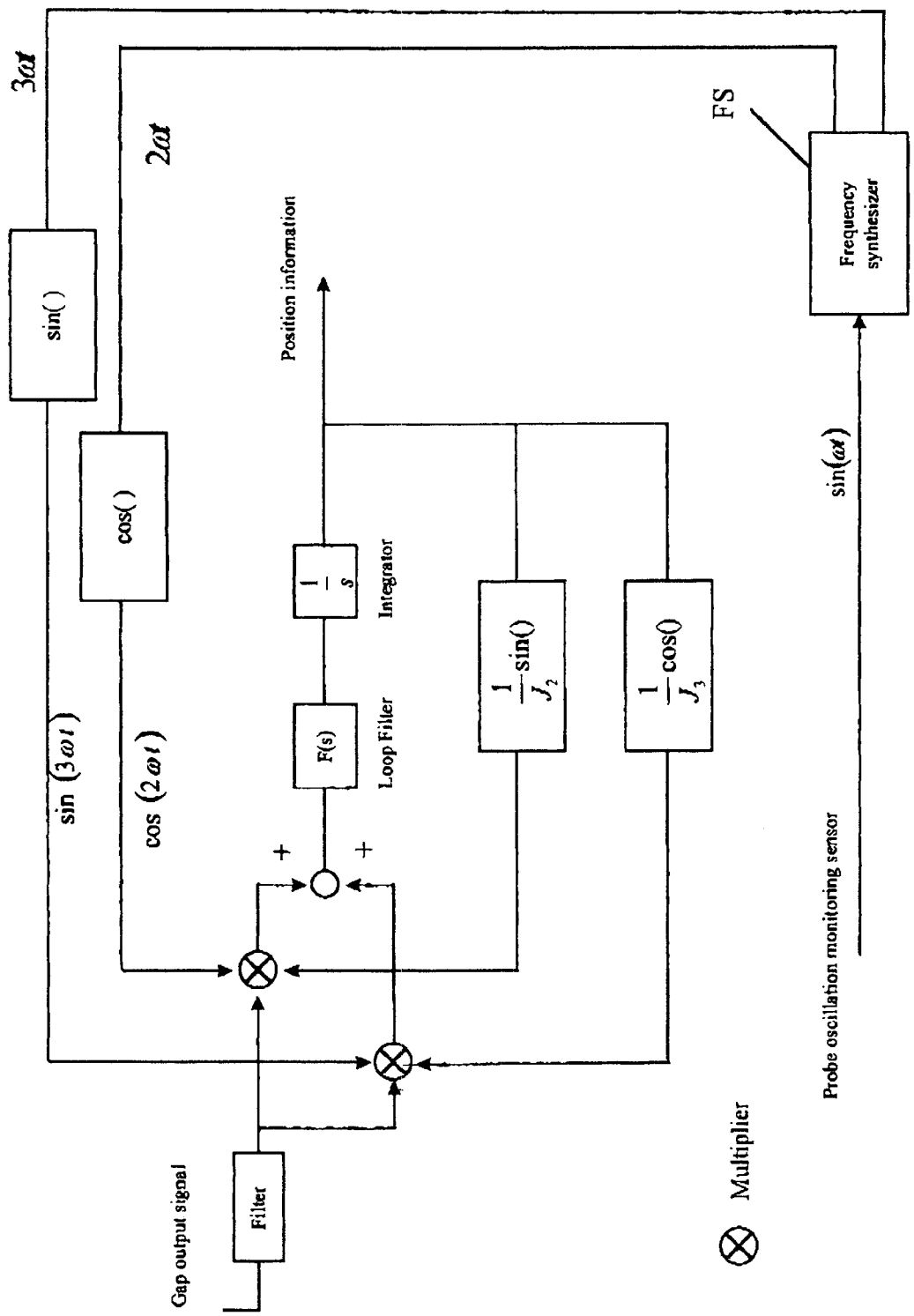
Figure 9:
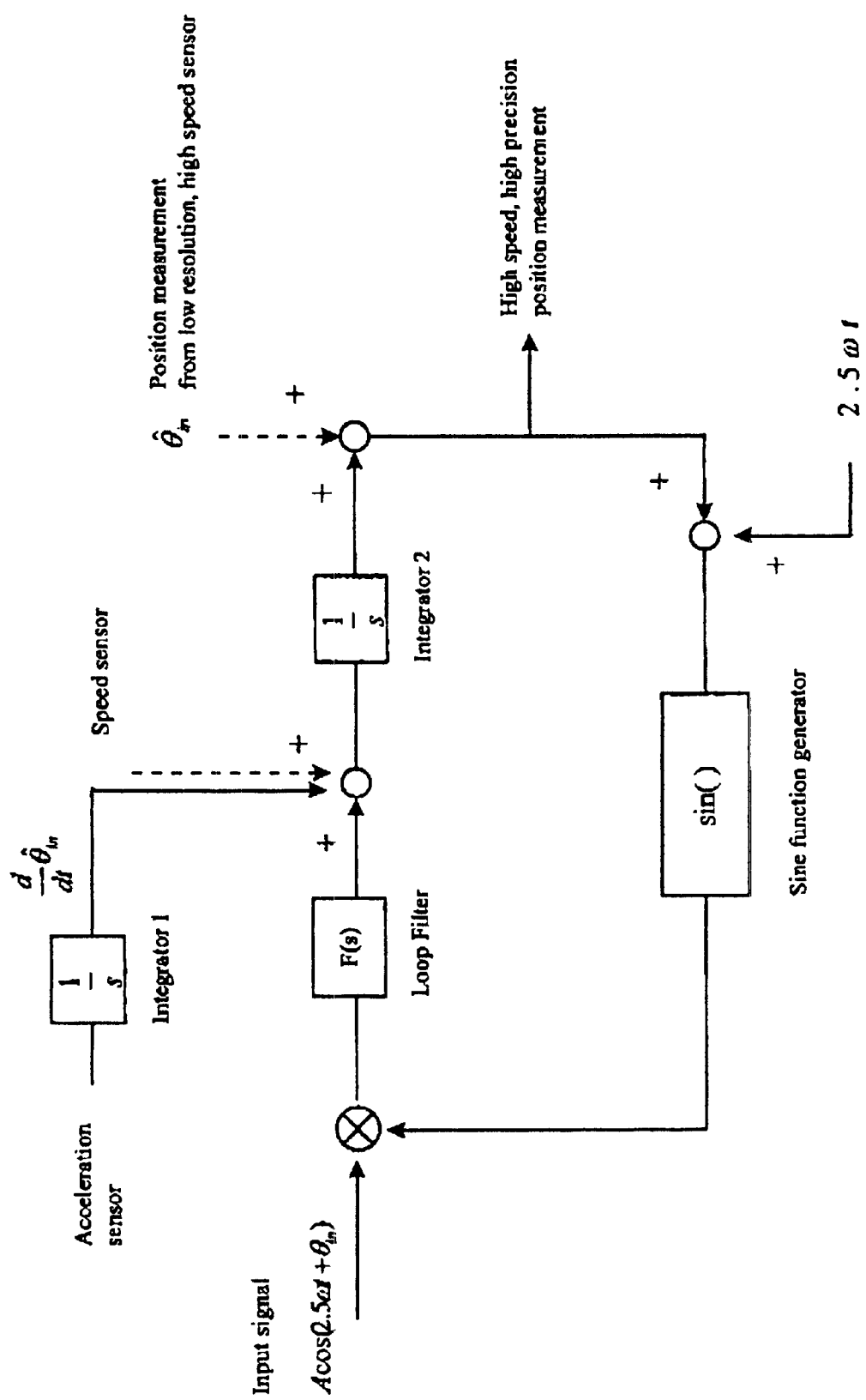
Figure 10:
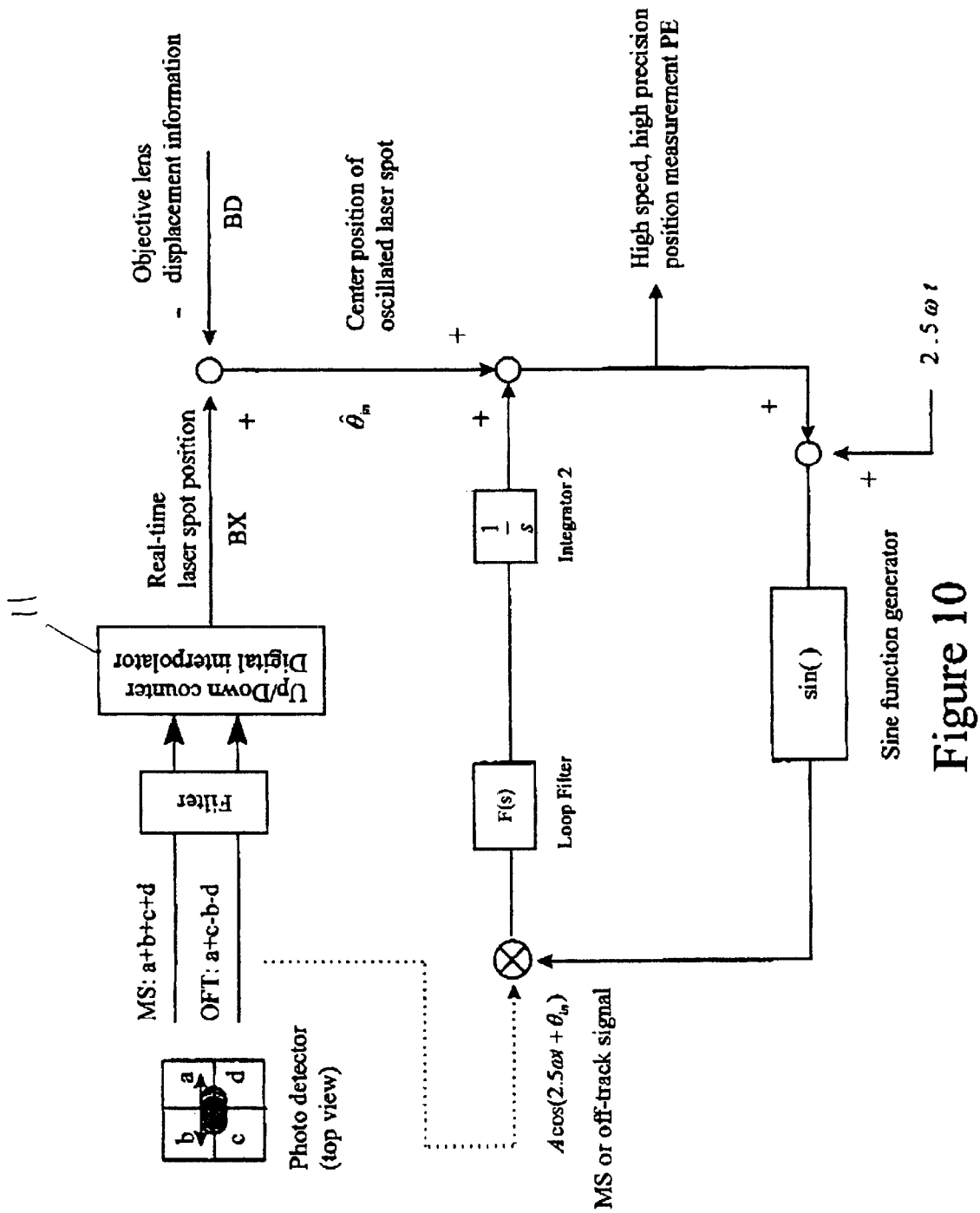
Figure 11:
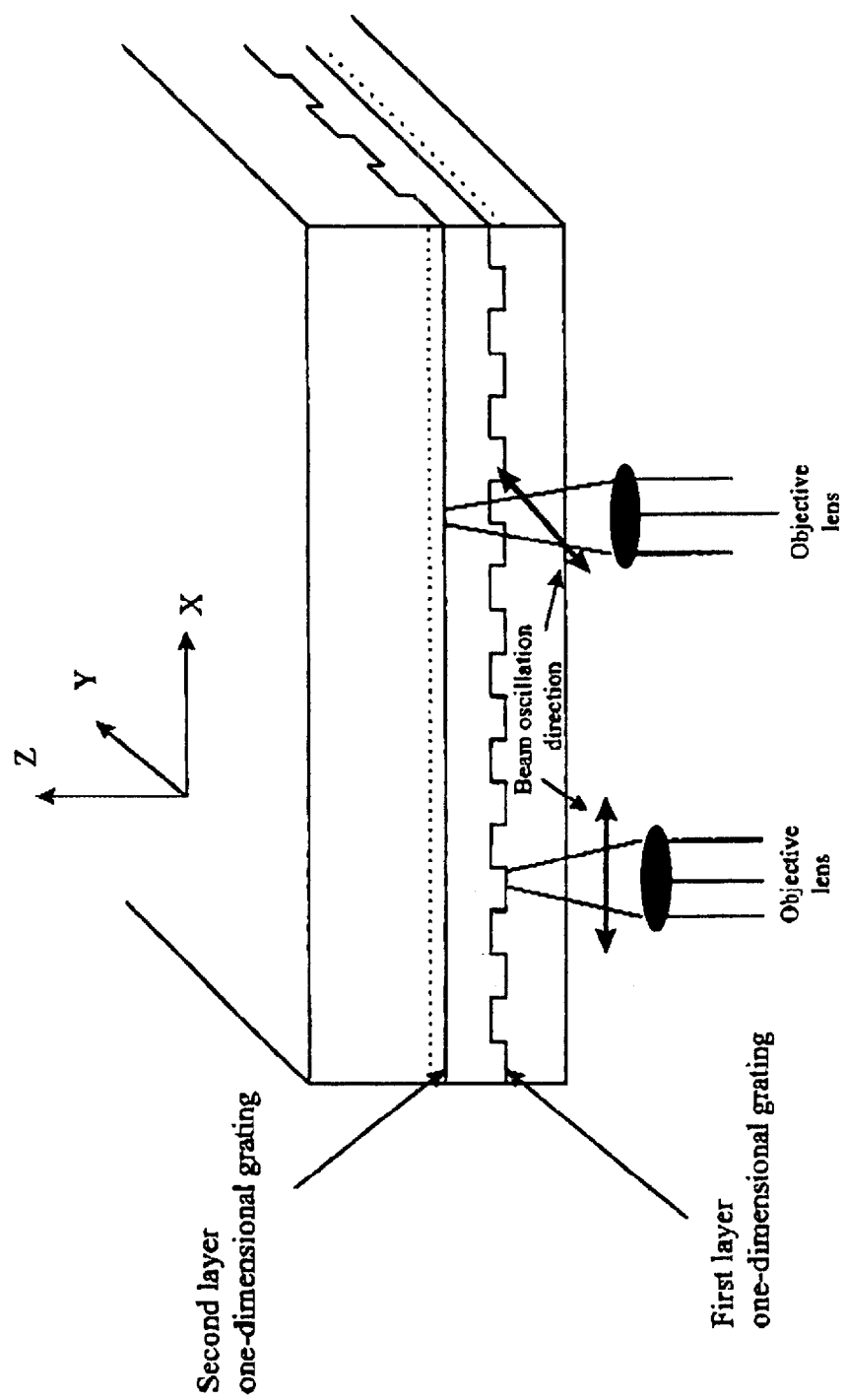
Figure 12:
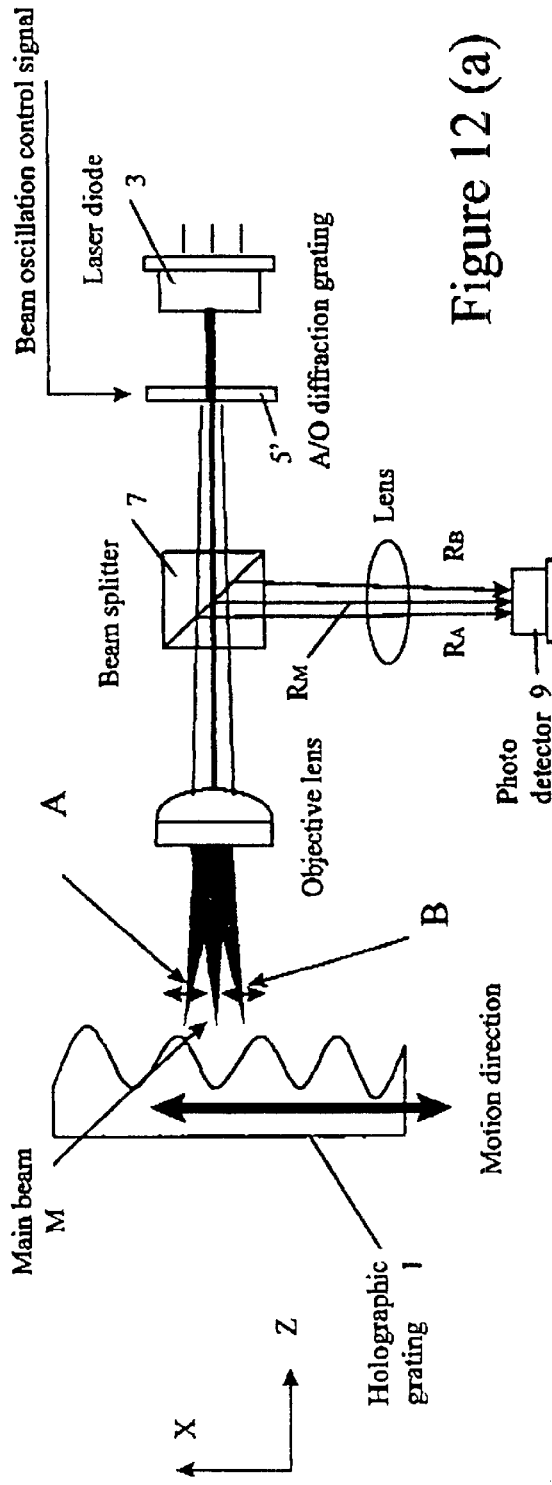
Figure 12:
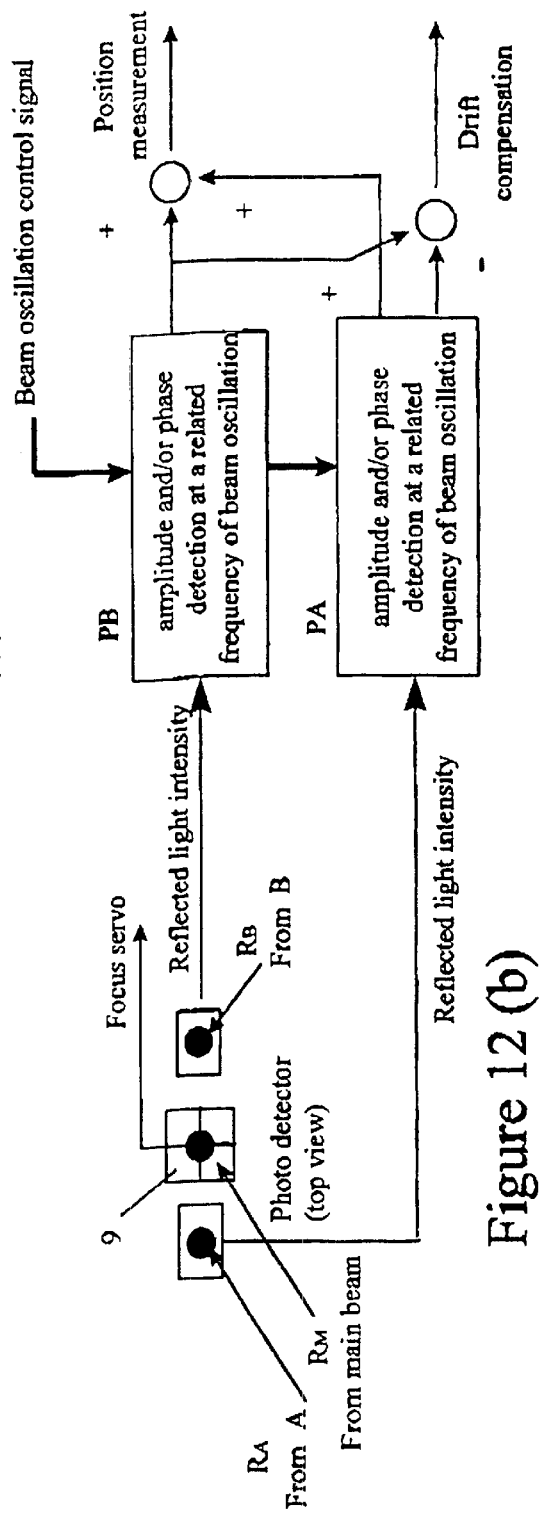

FIGS. 4(B) and 4(C) are experimentally obtained performance graphs of tests with the system of FIG. 4(A), showing the reconstructed grating image and the position measurements obtained, respectively;

FIGS. 5($a$) and ($b$) illustrate the control of the laser diode-produced beam shape to increase signal-to-noise (S/N) ratios;

FIG. 5A illustrates the scanning laser beam system of FIG. 4 used with a patterned magnetic media reference grating and providing index marking in the real-time position information;

FIG. 6 is a circuit diagram illustrating the calculation flow of the position measurement in the above figures without the need of tuning the probe oscillation amplitude;

FIG. 7 illustrates a circuit for attaining improved position detection flow in the systems of the above figures by the generation of an additional negative frequency signal to maintain PLL (Phase Locked Loop) tracking at high-speed stage motion;

FIGS. 8 and 8($b$) are circuit diagrams showing a simple method for increasing the maximum speed detection range by incorporating a phase tracking path using such a negative reference frequency;

FIG. 9 is a further circuit diagram illustrating the position measurement flow of the systems of the above figures using an acceleration sensor (or speed sensor or low resolution/high-speed position sensor) to improve the system response; and FIG. 10 shows the method of using a focused laser beam of FIGS. 4 and 5A, for example, to improve the total system response of the position measurement system;

FIG. 11 illustrates orthogonally scanning laser beams used with a multi-layer grating, enabling multi-dimensional position measurement; and FIGS. 12($a$) and 12($b$) respectively illustrate a multi-laser beam probing system similar to FIGS. 1(A) and 1(B) buit involving oppositely oscillating beams that compensate for laser wavelength shifts and the like.

DESCRIPTION OF PREFERRED EMBODIMENTS OF THE INVENTION

Turning first to the embodiment of FIG. 4, instead of the oscillating physical probe sensor used in certain embodiments of my said patents, there is shown a longitudinal-axis laser beam probe focused by the object lens L to impinge upon a holographic grating surface 1. The beam probe is shown in in FIG. 4 oscillated (up and down arrow) in two ways. One method is to vibrate the object lens L in the X-direction. A second method is to apply voltage, generated through a sinusoidal control signal D, to an acoustic-optic device A/O causing a diffraction angle change, or to an electro-optic device E/O causing a refractive index change. As a result, the focused laser beam spot moves correspondingly in the X-direction on the surface of grating 1. The laser beam, while it scans over the grating surface, is reflected back along the longitudinal axis to the beam splitter, so-labeled, from the successive points of the surface during the scan of the beam over the surface, and then transversely to the photodetector 9 through a focus lens.

The reflected laser beam generates a substantially sinusoidal current in the photodetector 9, the amplitude of which is proportional to the incoming light intensity. The intensity of the reflected beam changes from maximum to minimum with the same periodicity of the grating surface 1 during the scan over the grating surface.

Figure 3:
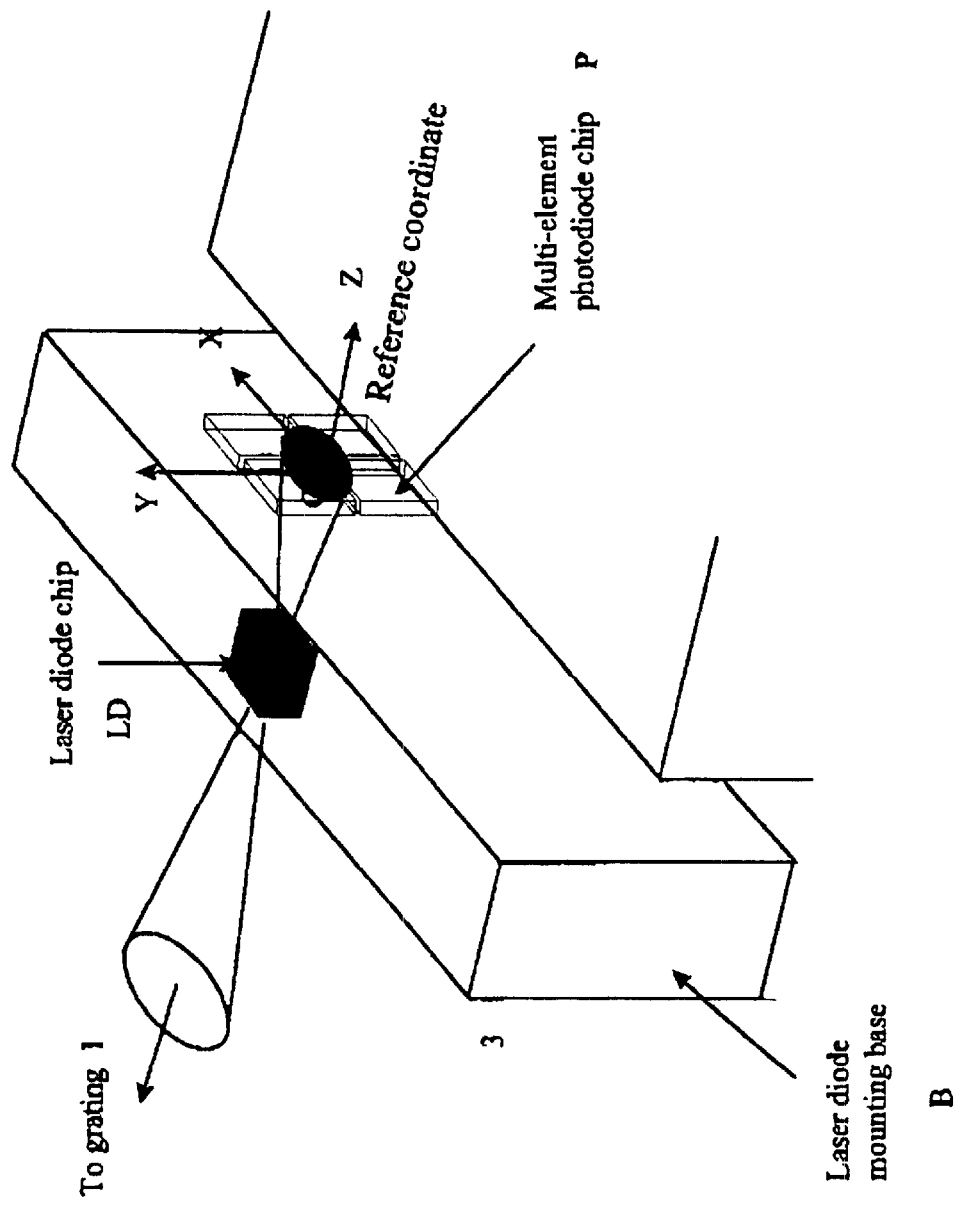

The substantially sinusoidal voltage output generated from the photodetector amplifier at 9 thus becomes similar to the gap distance sinusoidal voltage output disclosed in my said patents (Equation (1) of my earlier referenced U.S. Pat. No. 5,744,799), ready to be used with the amplitude/phase detection processing of the patent (FIGS. 3(b) and 6, for example), for position measurement signal processing, as indicated at P. Both the displacement of the object lens L while it is oscillated, and the applied control sinusoidal voltage to A/O, E/O devices and the like, indicate the precise laser beam oscillating timing and can therefore be used to synthesize the reference (control) signal for position measurement at P, as illustrated in FIG. 4 and disclosed in my above cited patent.

As taught in said patent, the processing (at P in FIG. 4) compares the phase and amplitude of such generated sinusoidal voltage and the control sinusoidal voltage through multiplying them and thereby develops positional signals on a continual basis indicative of the direction and distance of the probe beam off the apex of the nearest undulation of the surface, and thus the position of the probe beam along the surface.

Following the teaching in said FIG. 3(b) of my said patent, the amplitude and/or phase detection at a related frequency of the beam oscillation at the processor P of FIG. 4, of the present application, will involve comparing the phase and amplitude of the reflected light-beam-generated sinusoidal output signals from the photodetector circuit 9 with that of the beam-oscillating control or timing sinusoidal voltage to obtain information as to the position of the beam probe—its reference point direction from, and distance off the apex of the nearest surface peak or undulation—and thus indicate the position of the focused impinged beam probe along the surface 1. The preferred circuit implementation of P, as detailed in said patents, compares the amplitude of the control and generated output sinusoidal voltages of related frequency in respective multipliers followed by passing through respective phase detection and amplitude detection. The resulting probe positional information signals are thereby generated, as mathematically demonstrated in said patents and in my IEEE International Conference on Robotics and Automation Proceedings paper, "Real-time subnanometer position sensing with long measurement range", May 22, 1995, and as implemented in the nanometer positional measurement systems of the assignee of this application.

As earlier and hereinafter stated, moreover, this processing P is intended to be used with the signals generated by the systems of all of the figures of this application.

The system of FIG. 4 has been successfully experimentally operated, including in the form presented in FIG. 4(A), illustrating the set-up of an actual feasibility model used to prove the effectiveness of the invention. The laser beam emitted from the laser diode 3 (680 nm wavelength) was collimated, passed through the beam splitter and focused by the objective lens L onto the grating surface 1. Beam deflection was realized by applying a 1.5 Khz sinusoidal control current to a tracking actuator at D moving the objective lens L in the X-direction. The motion of the objective lens was monitored by an independent optical fiber displacement sensor (not shown) so that, at the same time, the analog focus servo system kept the distance between the objective lens L and the grating surface 1 constant.

The laser beam was reflected back along the longitudinal beam axis through the objective lens L, bent transversely at the beam splitter 7 and focused onto the photodetector 9. For the feasibility test, the Tracking Error Signal (TES) output generated from the photodetector 9 (the method indicated in FIG. 2(B)) was used as the sinusoidal signal corresponding to the grating periodicity, rather than using the total reflection intensity (RF) signal as indicated in FIG. 4. Both TES and RF signals, however, can be used for position measurement purposes.

FIG. 4(B) shows the actual image of the grating surface obtained, with a spatial period of 1.2 microns. This image was reconstructed by plotting TES in a vertical axis while the horizontal axis corresponds to the objective lens displacement in the X-direction. A distance somewhat longer than one grating period was observed.

FIG. 4(C) shows the test results of the position measurement using the above-described set-up. In this case, a spirally grooved plastic disc 1' with 1.2 micron track pitch was used as the grating substrate 1. The laser beam was oscillated in a direction perpendicular to the grooves, as shown. The disc was rotated at around 60 rpm, which caused the disc to move in the radial direction due to a center offset of the disc. The position measurement result shows that the frequency of such radial direction disc motion is the same as the disc rotational frequency, and that the peak-to-peak amplitude is about 30 microns. The gradual offset caused by the tracking actuator offset and shown in FIG. 4(C), may be readily countered by proper well-known design.

In the systems of FIGS. 4 and 4A, wherein the laser beam is oscillated above the grating surface 1, the instantaneous beam position BX from the center line of the beam oscillation (shown dotted) is represented as the displacement BD in FIG. 3A(a). The output BX of the up/down counter and digital interpolator 11 of FIG. 3(A)(b) will represent the instantaneous position of the laser beam spot on the reference grating surface as later explained in connection with FIGS. 1(B) and 2(B). Additionally, one can compare the maximum and minimum of the output signal from the photodetector 9 in one laser beam oscillation period, which is then used to adjust the offset and gain level of the output signal fluctuated by changes in the grating surface condition. The above-mentioned functions are shown in FIG. 3A(b) at SA. As a result, more precise signal interpolation is assured.

Meantime, the laser beam spot displacement BD on the grating surface 1 from its center position of the beam oscillation, FIG. 3A(a), is obtained either from the displacement sensor monitoring the object lens oscillation or from applied voltage to A/0, E/0 devices and the like, FIG. 4, depending upon the method used to oscillate the laser beam spot. As a result, it is possible to estimate the instantaneous position of the beam oscillation center by subtracting the output signal from the up/down counter and digital interpolator 11 to the beam spot displacement as illustrated in FIG. 3A(b).

Operating with oscillating beam probing analogously to the physical probe scanning of my said patents will also later be further discussed; but the present invention, through its use of beams, is not just limited to oscillating probes.

FIGS. 1(A) and 1(B) illustrate the invention operating with multiple fixed (shown as three), non-oscillating laser beams probing a holographic grating 1 used as a reference scale, and moving in the X-direction.

The longitudinal-axis beam emitted from the laser diode 3 is first divided by the beam splitter 7 into a main beam M, and into outer upper and lower adjacent somewhat diverging beams Beam A, and Beam B, then passing through a diffraction grating 5, as first order diffracted beams. These fixed beams A and B are focused to impinge upon the holographic grating surface 1 and are separated by (2 m+1)P/4, where m is an integer and P is the period of the undulations of the grating 1. The reflected light $R_A$ from Beam A and $R_B$ from Beam B, FIG. 1(B), generate two sinusoidal signals in the photodetector 9 with 90-degree phase difference, as the reference grating 1 moves in the X-direction. It is then easy to determine the motion direction and position from these quadrature signals by filtering and using a simple up/down counter and digital interpolation at 11.

Figure 2:
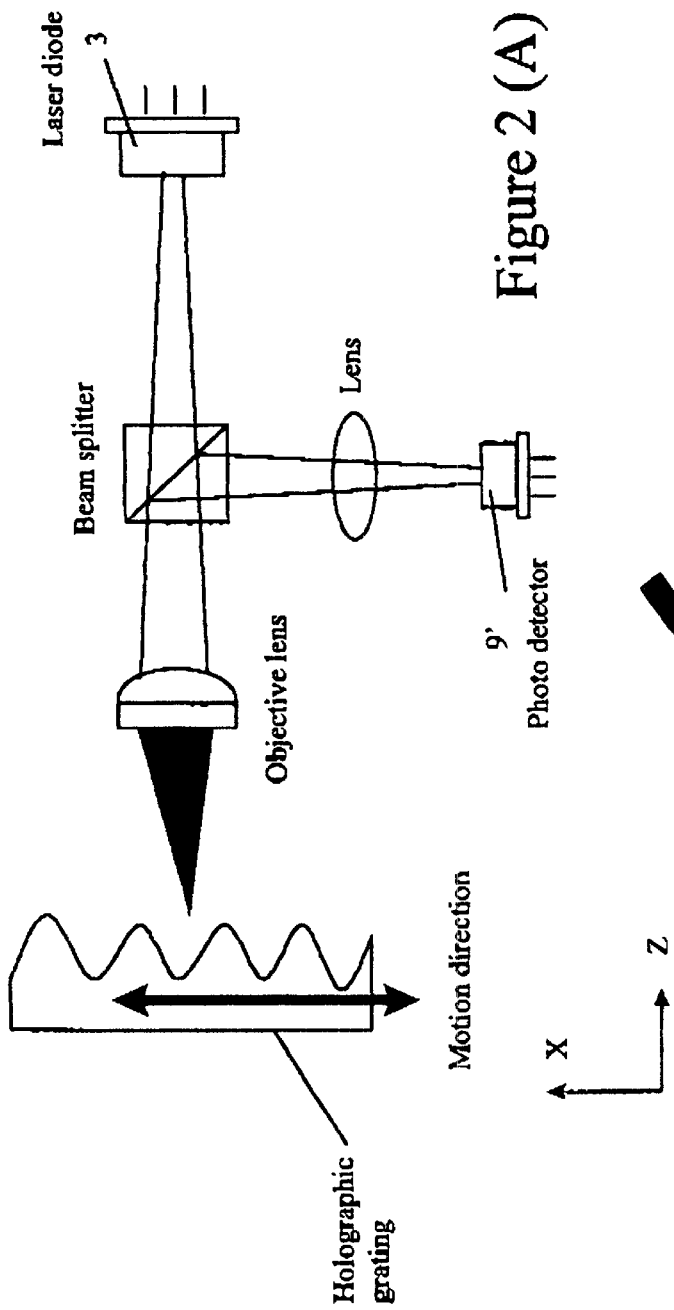
Figure 2:
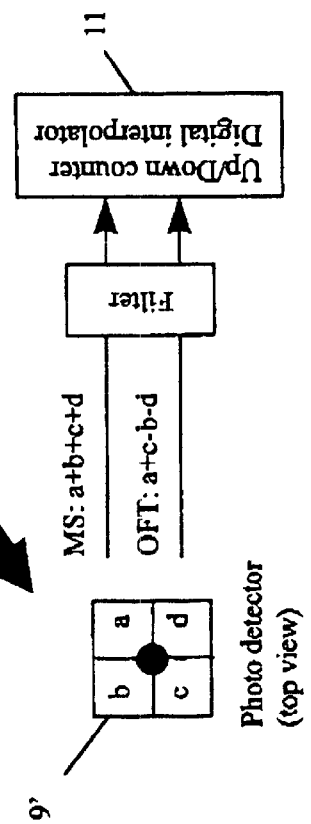

FIGS. 2(A) and 2(B) show another application using an off-track signal (OFT), obtained by the before-mentioned optical disc type push-pull or DPD method, as well as using the main signal (MS). The OFT and MS signals (quadrants signals a+c−b−d and a+b+c+d in the photodetector 9') will have a 90-degree phase difference as the reference grating 1 moves in the X-direction and thus can serve as a position encoder. The fixed laser beam is shown precisely focused on the grating surface 1 in order to maintain the gap distance between the objective lens, so labeled, and the grating surface 1. Thus, multi-axis position measurement can be obtained in such a laser-based system, by monitoring the displacement of the objective lens in the gap direction.

Normally, a laser diode, such as those at 3 in FIGS. 1(A) and 2(A), generates a significant amount of heat during operation. This will cause the thermal gradient between the laser diode and its mounting base to effect a slight movement of the laser diode position, resulting in position measurement error. It is possible to minimize such movement by controlling the temperature of the laser diode mounting base, though such tends to be bulky. This present invention introduces a simpler and thus lower-cost solution shown in FIG. 3. A photodiode chip P with multi-elements is placed right behind the laser diode (LD) chip facing the opposite side of the main emission point. The sum of the detected signal at each photodiode element will be used for laser beam intensity feedback control, as is well-known. The difference of the signals from each photodiode element now corresponds to the displacement of the laser beam position due to the thermal expansion or stress due to the thermal gradients of the mounting base B. As a result, the correct position measurement is obtained by subtracting the displacement signal from the measured position, or by keeping such displacement zero by moving the laser diode chip (LD) position. This helps increase the position measurement accuracy in such laser diode base systems.

In the fixed beam systems of FIGS. 1(A) and (B) and FIGS. 2(A) and (B), the focused laser beam can be used for position measurement, but with reliance on the accuracy of the reference grating in terms of repeatability and homogeneity of the sectional shape over the entire surface in order to get precise position measurement results. While a useful approach, in practice, it is sometimes difficult to perfect a reference scale due to grating surface roughness and the manufacturing process, and vibrational noise in the gap distance may cause some position measurement error.

While the invention has thus far been described with illustrative reference to the preferred laser beam probing, as earlier mentioned, other types of radiation beams may also usefully be employed for such probing. In the case of an electron beam or an ion beam, for example, the beam is generated in vacuum from hot electron or ion sources and can be easily oscillated by well-known electrical means, and thus at very high frequency. Beam oscillation amplitude can be precisely controlled by applied voltage to such a beam oscillator, with the operation being the same as disclosed in my said U.S. Pat. Nos. 5,589,686 and in 5,744,799. While resolution can be obtained that is the equivalent of using SPM-based systems, the operation, however, will generally need to be confined to a high vacuum environment.

As illustrated in FIG. 5(a), moreover, it is easy to extend the laser, electron or ion beams into oval or line shapes by sending the beam through various kinds of well-known optics or by applying appropriate electrical fields to the beam, causing the beam to behave like a line probe. Thus, a higher signal-to-noise (S/N) ratio can be obtained for the position measurement using these beams. A similar effect can be obtained by oscillating the beam spot at a much higher frequency in the Y-direction than the oscillating frequency in the X-direction, as shown in FIG. 5(b).

The gratings illustrated and described in connection with the laser beam probing systems of FIGS. 1(A) and (B), 2(A) and (B) and 4 and 4A, furthermore, may also be provided with magnetic surfaces. Recent progress on magnetic read/write head technology for hard disks and magneto optical discs with near field technology enables a bit length of approximately 100 nm or less, which can be readily used to produce a narrow-pitch grating. High precision magnetic gratings can also be fabricated by lithographic processes. A holographic grating covered by magnetic media with 100 nm period has already been fabricated which literally places nano-magnets on a substrate, as described, for example by M. Farhound, M. Hwang, J. M. Bae, K. Youcef-Toumi, H. I. Smith, and C. A. Ross, "Fabrication of large-area nano-structured magnets by interferometric lithography", IEEE Trans. Magn. (1998). Thus, by using such a patterned magnetic medium as a reference grating and by using a magnetic information reading head as a probe one can build a position measurement system following the same method disclosed in FIGS. 4 and 4A and in my said prior U.S. Patents. An advantage of this type of position measurement system is its capability of rewriting a bit pattern or recording a new bit pattern. As a result, grating pitch, duty cycle, index location, and tracking path are freely reconfigurable, and optimizable for each application. Another way of achieving the same functionality is to use a phase-changeable medium that changes the laser reflection as a result of a crystal state change in the medium, such as are commonly used for CD-R or CD-RW.

FIG. 5A shows a preferred method for providing an index position using such lithographically patterned magnetic media as a reference grating 1" and a focused laser beam as a probe. Real-time position information is obtained from the topographic information of the reference grating by oscillating the laser beam, as in earlier-described FIGS. 4 and 4A. The index mark, which is recorded magnetically on the center of a grating crest, apex or groove, can be simultaneously detected as, for example, by using a Kerr cell K or similar device. In this way, the position of the index mark is precisely determined at the detector 13 with no uncertainty, which is not the case when the index mark is separated from the reference grating area. If the application requires a different index mark, one can readily erase the old mark and generate a new one at the required position.

This similar concept can be applied to a multi-layered optical recording system, also, where a multiple layer as illustrated in FIG. 11 is formed in the grating substrate, and each layer can be independently recorded or read by confocal laser technology. In this case, one or more layers contains reference scales for multi-axis position measurement, and the other layer is used to record an index mark, absolute position information, or many other kinds of information, all without being restricted by the reference scale structure.

Turning, now, to consideration of the problems in controlling the probing beam oscillation amplitude in the systems of, for example, FIGS. 4, 4A and 5A, the technique disclosed in my U.S. Pat. No. 5,744,799 requires that the probe oscillation amplitude "r" be properly determined in order to simplify the position signal detection calculation. In practice, this means that the probe oscillation amplitude must be controlled precisely at the selected value, which requires extra circuits for the probe oscillation amplitude detection and control circuit controlling the oscillation of the beam.

It has now been discovered, however, that a more general position calculation can be obtained by multiplying the output voltage $V_{out}$ by second and third order harmonic signals of the probe oscillation with an estimated position included in their phases. As a result, the same position measurement result can be obtained without requiring the controlling of the probe oscillation amplitude at the specific value. Assuming that the probe oscillation amplitude is monitored (therefore known), first multiply $$\frac{1}{J_2(r\omega')}$$

$\sin(2\,\omega t + \omega' \hat{X}_0)$ by the output voltage $V_{out}$ and multiply $$\frac{1}{J_3(r\omega')}$$

$\sin(3\,\omega t + \omega' \hat{X}_0)$ by $V_{out}$, where $\hat{X}_0$ is an estimation of the current position. The other variables follow the same definitions in Equation (1) in my U.S. Pat. No. 5,744,799. When these two results are added together, the result can be expressed as:

$$V_{out}\left[\frac{1}{J_2(r\omega')}\sin(2\omega t + \omega' \hat{X}_0) + \frac{1}{J_3(r\omega')}\sin(3\omega t + \omega' \hat{X}_0)\right] = \quad (22)$$
$$\ldots + A\sin(\omega' \hat{X}_0 - \omega' X_0) \approx \ldots + A\omega'(\hat{X}_0 - X_0) \text{ when } X_0 \approx \hat{X}_0,$$

which gives the error signal between the real position and the estimated position. Thus, by forming a closed loop, the error signal in Equation (22), above, can be kept at zero. Accurate position information is then obtained as $X_0 = \hat{X}_0$.

FIG. 6 explains this calculation flow in the preferred circuit therein presented. The probe oscillation sensor output is first fed to a Frequency synthesizer FS while calculating the Bessel function values $J2(r\omega')$ and $j3(r\omega')$ in the above formula, since probe oscillation amplitude r can be measured at the same time. In the Frequency synthesizer FS, 2 times and 3 times faster frequency signals 2 ωt and 3 ωt are generated, which are synchronized with the incoming probe-oscillation monitoring sensor output. These signals are added to the instantaneous position estimation X̂0 and fed to the Sine function generator SGs as indicated in FIG. 6. The outputs from the two SGs are multiplied by the output voltage Vout and each result is summed in order to calculate the instantaneous position estimation error stated in Equation (22). These results are fed to the loop filter F(s) and integrator, so-labeled, to recalculate new instantaneous position estimations. By repeating this process, the position estimation eventually reaches the same as the real position information and stays the same.

As disclosed in U.S. Pat. No. 5,744,799, furthermore, one can convert the position information in the form of a phase signal in time domain by multiplying the output signal $V_{out}$ by cos(0.5 ωt). For example, if the probe oscillation amplitude r is selected to satisfy $J_2(r\omega') = J_3(r\omega')$, the frequency component at i=2 can be expressed as:

$$V_{out}\cos(0.5\,\omega t) = \ldots + AJ_2(r\omega)\cos(2.5\,\omega t + \omega' X_0). \quad (23)$$

However, this equation shows that when the grating table moves at the speed of $$\frac{dX_0}{dt} \approx \frac{-2.5\omega}{\omega},$$

the instantaneous frequency, $$2.5\omega + \omega\frac{dX_0}{dt}$$

in Equation (23), above, will become close to zero making a phase detection impossible. This sets a limit in maximum detectable speed with a previously disclosed method.

The present invention circumvents the problem by creating a negative reference frequency signal, by multiplying $V_{out}$ by sin(0.5 ωt). The resultant signal becomes $$V_{out}\sin(0.5\,\omega t) = \ldots + AJ_2(r\omega')\sin(2.5\,\omega - \omega' X_0). \quad (24)$$

Consequently, the instantaneous frequency of the above signal does not become zero with a table moving at the speed of $$\frac{dX_0}{dt} \approx \frac{-2.5\omega}{\omega}.$$

The concept of this invention is illustrated in the circuit diagram of FIG. 7. FIG. 7 is basically the same as FIG. 11(*b*) of my said U.S. Pat. No. 5,744,799 except that the Frequency synthesizer FS generates a negative frequency. In FIG. 7, the probe oscillation sensor output is fed into the Frequency synthesizer FS, which generates negative frequency "−2.5 ωt", and cos(0.5 ωt). The incoming output signal, after signal conditioning through the filter, is multiplied by cos(0.5 ωt), converting the position information into a phase modular signal as disclosed in Equation (24). The phase information is then extracted in PD enabling the high precision position measurement.

Similarly, the method which creates the negative reference frequency can be applied to the method underlying Equation (22), above. In this case, first multiply $$\frac{1}{J_2(r\omega')}\sin(2\omega t + \omega' \hat{X}_0) \text{ by } V_{out} \text{ and } \frac{-1}{J_3(r\omega')}\sin(-3\omega t + \omega' \hat{X}_0) \text{ by } V_{out}$$

and then add these two results as:

$$V_{out}\left[\frac{1}{J_2(r\omega')}\sin(-2\omega t + \omega' \hat{X}_0) - \frac{1}{J_3(r\omega')}\sin(-3\omega t + \omega' \hat{X}_0)\right] = \quad (25)$$
$$\ldots + A\sin(\omega' \hat{X}_0 - \omega' X_0) \approx \ldots + A\omega'(\hat{X}_0 - X_0) \text{ when } X_0 \approx \hat{X}_0$$

While switching the operations between Equations (23) and (24), depending on the motion direction, can be a straight-forward solution, one of the preferred embodiments of this invention is illustrated in FIG. 8. The phase error signals corresponding to positive and negative reference frequencies are simply summed. and fed into the loop filter. With this method, the phase-locked loop works with either or both of the positive or negative reference frequency paths regardless of the motion direction; thus the maximum detection speed using the new invention becomes independent of the motion direction. In FIG. 8, two phase tracking loops for position measurement are running in parallel; these loops being based on positive and negative reference frequencies as disclosed in FIG. 11(*b*) in my said U.S. Pat. No. 5,744,799 and FIG. 7 in this invention. This example assumes that the probe oscillation amplitude is strictly controlled so that it satisfies the before-mentioned condition that $J_2(r\omega')=J_3(rw')$. The output of the probe oscillation monitoring sensor is first fed to the Frequency synthesizer FS generating frequency signals of 2.5 ωt which are added or subtracted from the instantaneous position estimation $\hat{X}0$ and fed to the Sine/Cosine function generators indicated in FIG. 8. In the outputs from the Sine/Cosine function generators are multiplied by the output voltage Vout together with sin(0.5 ωt) and cos(0.5 ωt) and the results are summed before feeding to the loop filter F(s) and integrator, where new instantaneous position estimation is obtained. By repeating this process, the position estimation eventually reaches the same as the real position information and stays the same regardless of the motion direction of the stage 1, so long as the bandwidth of the SPM or beam energy-based signal amplifier allows.

Similar operation is shown in FIG. 8(*b*) for the system of FIG. 6, before-discussed.

With the use of a simple multiplier phase detector, maximum detectable acceleration based on the method disclosed in my before-mentioned U.S. Pat. No. 5,744,799 is given as $$\frac{d^2 X_0}{dt^2} < \frac{\omega_{pH}^2}{2\omega}, \quad (26)$$

where ω is the spatial frequency of the grating and the $\omega_{pH}$ is the bandwith of the PLL, which is generally designed to be 5–10 times slower than probe oscillation frequency. If the stage moves beyond such acceleration, the PLL may no longer be able to track the table motion.

For applications requiring quick response of the position measurement in, for example, systems like FIG. 4, moreover, it is necessary to increase the probe oscillation frequency, which is often difficult and costly. On the other hand, this invention offers a low-cost solution to break such theoretical limitations by using an independent acceleration sensor or speed sensor or low resolution/high-speed position sensing system inside the phase locked-loop. FIG. 9 illustrates this method of position measurement using, as an example, an acceleration sensor, so-labeled. A speed sensor or low resolution/high-speed position sensors may also be used; but the location of the entry position to the PLL will vary as depicted by the dashed line. Here, the input signal represents Equation (5) in my U.S. Pat. No. 5,744,799. The sensor output from the acceleration sensor is first channeled through an "Integrator 1", the result of which is a close estimation of actual speed; this is then added to the loop filter output before feeding into the "Integrator 2" in the PLL. If a position sensor is used instead, the sensor output will be summed just before the Sine/Cosine function generator in the PLL. In this way, the PLL only needs to adjust for minor phase error. As a result, the precision and the resolution of the final position measurement will not be affected, regardless of the table motion range since the phase error (thus position estimation error) will be corrected by the closed loop. Furthermore, the acceleration, speed or position sensor reduces the burden on the PLL to track the source signal which will have a quickly changing frequency as a result of high-speed table motion or its rapid acceleration. The reduction of this burden dramatically increases the detection capability without adding significant cost to the total system.

FIG. 10 illustrates the same method, applied specifically to the focused laser beam position measurement system of FIGS. 1(B) and 2(B). As disclosed in FIG. 3A(*b*), although this position information may contain some inaccuracy due to the surface roughness of the grating or vibration noise, despite the correction method mentioned earlier, high-speed detection is easy to design. As a result, by feeding this information as shown in FIG. 10 through a phase tracking system as disclosed in previously discussed FIG. 9, a high speed and high precision position measurement system can be achieved. FIG. 10 thus shows an example of the method applied to the focused laser beam based system employing the method described in FIGS. 2(A) and 2(B) and FIGS. 3A(*a*) and (*b*), with objective lens oscillation. Using the generated signals MS and OFT from photodetector, real-time laser spot position BX is obtained after passing through Up/down converter and digital interpolator 11, as explained earlier. In order to obtain the center position of the laser beam oscillation, beam spot displacement BD from the beam oscillation center is subtracted from the BX, which produces $\hat{\theta}_{in}$. Since $\hat{\theta}_{in}$ is obtained by straightforward calculation and does not involve many dynamics related to the signal processing, the measurement response can be very quick. One can therefore utilize $\hat{\theta}_{in}$ as a quick, rough estimation to increase the dynamic response of the position measurement system disclosed in my said U.S. Pat. No. 5,744,799. As shown in FIG. 10, furthermore, $\hat{\theta}_{in}$ is added to the result of Integrator 2, which is fed to sine function generator after adding 2.5 ωt phase, which is synthesized from the beam probe oscillation. The output of the function generator is then multiplied by the phase modulated signal as shown in Equation (5) in my said U.S. Pat. No. 5,744,799, where $\theta_{in}$ represents the real-time position information. By repeating this process, the position estimation PE eventually reaches the same as the real position information $\theta_{in}$ and stays the same.

Though of great usefulness with the laser (or other) beam probes of the present invention, the improvements of obviating the need for strict control on probing oscillation afforded in before-described FIGS. 6 and 8(*b*), of increased detection speed by generating a negative reference frequency as in earlier explained FIGS. 7 and 8, and the improvement in positioning sensing response through the use of position (speed) acceleration sensor as in FIG. 9, and in FIG. 10, are also useful with the physical type probes of my said earlier patents, as well.

As disclosed in my said U.S. Pat. No. 5,744,799, (FIG. 26), though primarily dealing with physical and capacitive probes and the like, one can easily extend the focused beam probing systems of the present invention also to multi-dimensional position measurement systems, as well. When the table moves in X and Y directions at the same time at high-speed, however, such position measurement starts to show some limitation since the motion in the non-interest direction interferes with the position measurement in the interest direction. For example, accuracy of the X-directional position measurement taken with the probe will be effected by Y-directional motion of the XY stage. This may cause position measurement error, limiting the detectable speed in a multi-dimensional position measurement application.

One solution for physical probes is to use a blade-like probe as disclosed in FIG. 14(b) in my prior said U.S. Pat. No. 5,744,799. In this case, when a blade width is much larger than the grating period and the coordinate of a two-dimensional grating is placed in parallel with such blade-like probe edge, the effect of the motion in the Y direction of the grating (table) on a position reading in the X direction will be reduced.

Turning to laser-focused team based position measurement systems as disclosed in this application, however, an ideal solution to this problem is readily obtained. As shown in FIG. 11, the grating may be formed in multi-layers as commonly employed for DVD-ROM technology. Two orthogonally scanning laser beams are used as illustrated. The first layer is made half transparent so that it allows one laser beam to focus on the second layer. Since each laser beam can read the grating surface information on the corresponding layer independently, the position measurement function can be reduced to a single axis position measurement technique, assuming that each layer forms a one-dimensional grating, but in orthogonal directions. Thus, there is no need for complicated calculations, nor a restriction on table motion speed, probe shape, etc. This invention simplifies the system design and yet provides a thermally stable, compact, and high performance multi-axis position measurement system for focused beam probing.

It has earlier been mentioned that A/0 devices may be used for beam deflection, as, for example, in the embodiment of FIG. 4. For a high frequency beam oscillation, indeed, the A/O device is probably the fastest method to be employed for practical beam deflection angle. In beam-steering applications, Bragg diffraction is commonly used since it only requires a single beam and has lower optical power loss. Such generally requires precise manufacturing control in the crystal thickness, through which the laser beam goes, and the whole device tends to be bulky. On the other hand, Raman-Nath diffraction is based on a basic grating and can easily be integrated into the IC, producing multiple diffracted beams as shown in FIG. 1(A) and FIG. 12(a). This invention can make efficient use of the Raman-Nath diffraction grating, resulting in a high-speed, thermally stable nano-scale position measurement as illustrated in FIGS. 12(a) and (b).

Recent progress on surface acoustic wave devices, moreover, now enables high-frequency operation up to 1 Ghz range, so that very high frequency beam oscillation can be obtained for the purposes of the present invention without any movement of mechanical parts. The size of the device, furthermore, is tiny enough to be used in cellular phones and in many other wireless communication devices. Acoustic waves generated by IDT (interdigital transducer) on the crystal surface Will diffract the laser beam passing through (K. Iizuka, Engineering Optics, second edition, Springer-Verlag Berlin Heidelberg 1985 and 1987, printed in Germany). As a result, the diffraction angle for the +/−$1^{st}$ order light beams ($R_A$ and $R_B$ in FIGS. 1(A) and (B) and FIGS. 12(a) and (b)), can be controlled by changing the applied signal frequency on IDT. The $0^{th}$ order diffracted beam, which does not oscillate, can be used for focused servo control and even for position measurement as shown in FIGS. 2(A) and (B) and in FIG. 10.

In practice, the laser diode 3 may experience a slight wavelength shift during operation, which can cause the diffraction angle to change. Since this will result in a position measurement change, accurate position measurement becomes difficult. This invention solves this problem by processing both +$1^{st}$ and −$1^{st}$ order light beams ($R_A$ and $R_B$) for position measurement as earlier mentioned in this application. The diffraction angle change will shift the beam oscillation center position for Beams A and B on the grating surface 1 by equal distances, but in opposite directions.

Thus, by taking the average of the position measurement results from both processing units in PA and PB, FIGS. 12(a) and (b), one can effectively cancel out the position drift due to the laser beam wavelength shift. Meanwhile, the difference of the position measurement from PA and PB indicates the amount of laser wavelength shift, which can be compensated for by adjusting the center frequency of the oscillation control signal.

Finally, since an A/O device can be controlled at such highspeeds, it becomes possible to change the status from oscillation to non-oscillation of the beam probes within a matter of nanoseconds. By taking advantage of this feature together with the method mentioned in FIGS. 1(A) and (B) and FIGS. 12(a) and (b), one can construct an ultra-fast, nanometer scale position measurement system at a low cost.

Further modifications will also occur to those skilled in this art, and such are considered to fall within the spirit and scope of the invention as defined in the appended claims.

What is claimed is:

1. A method of real-time nanometer scale position measurement of the location of a radiation beam probe relatively moving over a periodically undulating surface, that comprises, focusing and impinging the beam upon the surface during such relative movement and receiving the successive reflections of the beam from the surface; generating substantially sinusoidal voltages through the reception of the beam reflections having the periodicity of the surface undulations; comparing the phase and amplitude of the generated sinusoidal voltages with a reference sinusoidal voltage at a related frequency through multiplying the generated and reference voltages to develop positional signals, on a continual basis, indicative of the direction and distance of the beam probe off the apex of the nearest undulation of the surface, and thus the position of the beam probe along the surface.

2. The method of claim 1 wherein the radiation beam probe is generated by collimating laser light along a longitudinal axis and focusing the light as a probing beam upon said surface.

3. The method of claim 2 wherein beam reflections from said surface are returned first along said axis, and are then split transversely therefrom and focused upon a photodetector receiver.

4. The method of claim 1 wherein the beam probe is oscillated under the control of a controlling sinusoidal voltage the serves as said reference voltage.

5. The method of claim 4 wherein requirements in the controlling of the amplitude of the probe oscillating are relaxed through introducing multiplying the generated sinusoidal voltages by second and third order harmonics of the probe oscillation frequency and adding to the estimated probe position information in the comparing step.

6. The method of claim 5 wherein a closed loop is created according to equation (22) herein to keep error between said estimated position and the real position at substantially zero.

7. The method of claim 4 wherein increased detection speed is obtained by generating a negative reference frequency by multiplying the generated sinusoidal voltage of frequency ω by sin (0.5 ωt) and using such in said comparing step.

8. The method of claim 7 wherein the resultant signal is that of equation (24) herein.

9. The method of claim 4 wherein improved positioning sensing response is attained by introducing independent acceleration or speed sensing within the voltage output in the comparing step.

10. The method of claim 4 wherein multi-dimensional position measurement is effected by forming the surface in multi-layers and employing orthogonally scanning beams to focus on the respective layers.

11. The method of claim 1 wherein the beam probe consists of a single focused beam.

12. The method of claim 1 wherein the radiation beam is selected from the group consisting of laser, electron and ion beams.

13. A method of real-time nanometer scale position measurement of the location of a radiation beam probe relatively moving over a periodically undulating surface, that comprises, focusing and impinging the beam upon the surface during such relative movement and receiving the successive reflections of the beam from the surface; generating substantially sinusoidal voltages through the reception of the beam reflections having the periodicity of the surface undulations; comparing the phase and amplitude of the generated sinusoidal voltages with a reference sinusoidal voltage at a related frequency through multiplying the generated and reference voltages to develop positional signals, on a continual basis, indicative of the direction and distance of the beam probe off the apex of the nearest undulation of the surface, and thus the position of the beam probe along the surface and wherein the beam probe comprises a plurality of adjacent focused beams.

14. The method of claim 13 wherein the beams are fixed-focused upon adjacent points of the surface.

15. The method of claim 14 wherein the separate generated sinusoidal voltages of the reflected beams comprising the beam probe are compared to determine the beam probe position along the surface.

16. The method of claim 15 wherein said plurality comprises a main central reference beam and outer adjacent beams, separated by (2m+1)P/4, where m is an integer and P is the period of the undulations of said surface, wherein the reflected beams generate respective sinusoidal quadrature voltages with 90-degree phase difference as the beam probe and surface relatively move past one another.

17. The method of claim 16 wherein said comparing includes filtering, up/down counting and digital interpolation of the quadrature voltages to determine motion direction and beam probe position.

18. Apparatus for real-time nanometer scale position measurement of the location of a radiation beam probe relatively moving over a periodically undulating surface, having, in combination, a radiation beam source; and optical system for focusing and impinging the beam from the source upon the surface during such relative movement and receiving the successive reflections of the beam from the surface; detector means for generating substantially sinusoidal voltages through the reception of the beam reflections having the periodicity of the surface undulations; and means for comparing the phase and amplitude of the generated sinusoidal voltages with a reference sinusoidal voltage at a related frequency through multiplying the generated and reference voltages to develop positional signals, on a continual basis, indicative of the direction and distance of the beam probe off the apex of the nearest undulation of the surface, and thus the position of the beam probe along the surface.

19. The apparatus claimed in claim 18 wherein oscillating means is provided for oscillating the beam probe under the control of a controlling sinusoidal voltage that serves as said reference voltage.

20. The apparatus claimed in claim 19 wherein the optical system returns the beam reflections from said surface first along said axis, and then to a beam-splitter to bend the beam transversely therefrom and then focused upon a photodetector receiver.

21. The apparatus claimed in claim 18 wherein the radiation beam is generated by a laser light source and the optical system collimates the beam along a longitudinal axis and focuses the beam as a probing laser beam upon said surface.

22. The apparatus of claim 18 wherein the beam probe is formed as a single focused beam.

23. The apparatus of claim 18 wherein the radiation beam is selected from the group consisting of laser, electron and ion beams.

24. Apparatus for real-time nanometer scale position measurement of the location of a radiation beam probe relatively moving over a periodically undulating surface, having, in combination, a radiation beam source; and optical system for focusing and impinging the beam from the source upon the surface during such relative movement and receiving the successive reflections of the beam from the surface; detector means for generating substantially sinusoidal voltages through the reception of the beam reflections having the periodicity of the surface undulations; and means for comparing the phase and amplitude of the generated sinusoidal voltages with a reference sinusoidal voltage at a related frequency through multiplying the generated and reference voltages to develop positional signals, on a continual basis, indicative of the direction and distance of the beam probe off the apex of the nearest undulation of the surface, and thus the position of the beam probe along the surface and wherein the beam probe is formed as a plurality of adjacent focused beams.

25. The apparatus of claim 24 wherein the optical system fixed-focuses the beams upon adjacent points of the surface.

26. The apparatus of claim 25 wherein the separate generated sinusoidal voltages of the reflected beams comprising the beam probe are compared to determine the beam probe position along the surface.

27. The apparatus of claim 26, wherein said plurality comprises a main central reference beam and outer adjacent beams separated by (2m+1)P/4, where m is an integer and P is the period of the undulations of said surface, wherein the reflected beams generate respective sinusoidal quadrature voltages with 90-degree phase differential as the beam probe and surface relatively move past one another.

28. The apparatus of claim 27 wherein said comparing means includes means for filtering, up/down counting and digital interpolation of the quadrature voltages to determine motion direction and beam probe position.

* * * * *